US010732722B1

(12) United States Patent
Heraz

(10) Patent No.: US 10,732,722 B1
(45) Date of Patent: Aug. 4, 2020

(54) DETECTING EMOTIONS FROM MICRO-EXPRESSIVE FREE-FORM MOVEMENTS

(71) Applicant: Emaww, Saint-Lambert (CA)

(72) Inventor: Alicia Heraz, Saint-Lambert (CA)

(73) Assignee: Emaww, Saint-Lambert (CA)

( * ) Notice: Subject to any disclaimer, the term of this patent is extended or adjusted under 35 U.S.C. 154(b) by 71 days.

(21) Appl. No.: 15/669,316

(22) Filed: Aug. 4, 2017

Related U.S. Application Data

(60) Provisional application No. 62/372,987, filed on Aug. 10, 2016.

(51) Int. Cl.
| | |
|---|---|
| *G06F 3/01* | (2006.01) |
| *A61B 5/00* | (2006.01) |
| *G06F 3/16* | (2006.01) |
| *G06F 3/14* | (2006.01) |
| *H04N 21/00* | (2011.01) |
| *G06F 3/041* | (2006.01) |
| *G06K 9/00* | (2006.01) |
| *G06K 9/66* | (2006.01) |
| *G06F 40/30* | (2020.01) |

(52) U.S. Cl.
CPC ............ *G06F 3/017* (2013.01); *G06F 3/0414* (2013.01); *G06F 40/30* (2020.01); *G06K 9/00355* (2013.01); *G06K 9/00885* (2013.01); *G06K 9/66* (2013.01)

(58) Field of Classification Search
CPC ........ G06F 3/017–04883; G06F 3/011; H04L 63/0861; G06G 3/1423–3/165; H04N 21/42201; A61B 5/7207; A61B 5/746
See application file for complete search history.

(56) References Cited

U.S. PATENT DOCUMENTS

| | | | | |
|---|---|---|---|---|
| 2004/0041842 A1* | 3/2004 | Lippincott | ............ | G06F 3/1423 715/783 |
| 2012/0165096 A1* | 6/2012 | Geisner | ................... | G06F 3/011 463/36 |
| 2013/0018837 A1* | 1/2013 | Lee | ........................ | A61B 5/165 706/52 |
| 2013/0257757 A1* | 10/2013 | Kim | ........................ | G06F 3/165 345/173 |
| 2014/0136450 A1* | 5/2014 | Lee | ........................ | G06N 7/005 706/11 |

(Continued)

*Primary Examiner* — Lin Li

(74) *Attorney, Agent, or Firm* — Fish & Richardson P.C.

(57) ABSTRACT

Computerized methods and systems, including computer programs encoded on a computer storage medium, may adaptively predict expression of emotions based on collected biometric data. For example, a computing system may receive first data indicative of a first time-evolving movement of a portion of a body during a collection period, and may obtain second data identifying predictive models that correlate default emotions with second feature values that characterize body movements during prior collection periods. Based on an outcome of the application of the least one pattern recognition algorithm or machine learning algorithm to portions of the first and second data, the system may determine a corresponding one of the default emotions represented by the first time-evolving movement, and may transmit data indicative of the corresponding one of the default emotions to the communications device for presentation to a user.

23 Claims, 9 Drawing Sheets

(56) References Cited

U.S. PATENT DOCUMENTS

| | | | |
|---|---|---|---|
| 2014/0201126 A1* | 7/2014 | Zadeh | A61B 5/4803 706/52 |
| 2014/0212007 A1* | 7/2014 | Oh | G06F 3/04883 382/119 |
| 2014/0267100 A1* | 9/2014 | Sohn | G06F 3/0416 345/173 |
| 2015/0002483 A1* | 1/2015 | Case | G06F 3/03545 345/179 |
| 2015/0006376 A1* | 1/2015 | Nuthulapati | G06Q 20/341 705/41 |
| 2015/0128037 A1* | 5/2015 | Lee | G06F 9/454 715/703 |
| 2016/0059412 A1* | 3/2016 | Oleynik | B25J 9/0087 700/257 |
| 2016/0381534 A1* | 12/2016 | Kwon | H04N 21/42201 455/556.1 |
| 2017/0199570 A1* | 7/2017 | Kwon | G06F 3/015 |
| 2017/0340257 A1* | 11/2017 | Aung | A61B 5/165 |
| 2018/0000407 A1* | 1/2018 | Johnson | A61B 5/746 |
| 2018/0035950 A1* | 2/2018 | Akl | A61B 5/7207 |
| 2018/0061415 A1* | 3/2018 | Penilla | G10L 15/063 |

\* cited by examiner

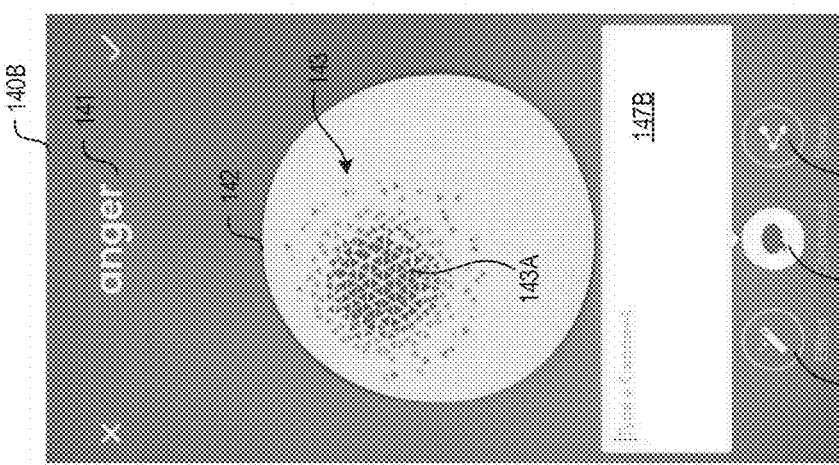
FIG. 1F
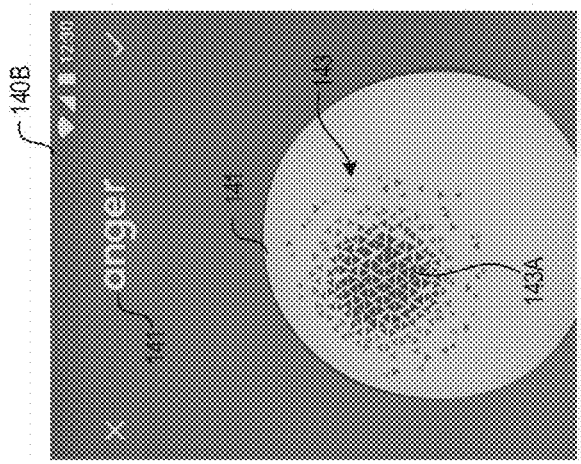
FIG. 1G
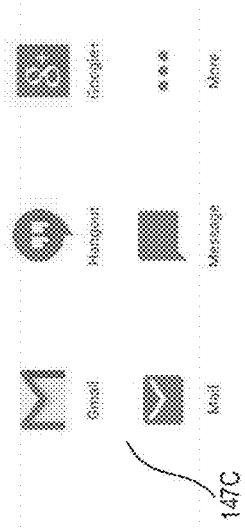
FIG. 1H
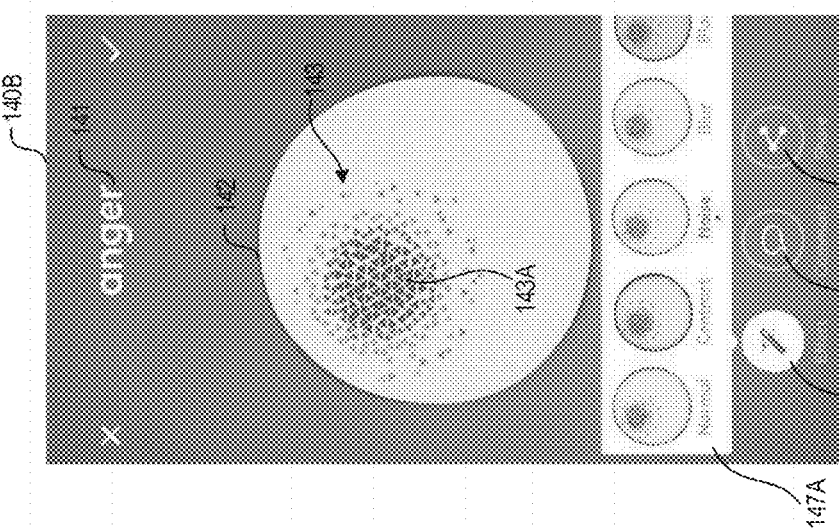

DETECTING EMOTIONS FROM MICRO-EXPRESSIVE FREE-FORM MOVEMENTS

CROSS-REFERENCE TO RELATED APPLICATION

This application claims the benefit of U.S. Provisional Application No. 62/372,987, filed Aug. 10, 2016, and titled "Deriving, Visualizing, and Sharing Emotional State," which is incorporated by reference.

FIELD

This specification describes technologies related to processes that derive, visualize, and share emotional state.

BACKGROUND

Individuals attempt to characterize their emotion state, and to unlock and better understand not only their expressed emotions, but the underlying causes of the expressed emotions. Further, individuals attempt to share indicia of their emotional state based on graphical representations, such as an emoji shared by an individual across a text-messaging platform or among linked members of a social network.

SUMMARY

This specification describes a system that determines an emotion expressed by an individual through a time-evolving, expressive, free-form movement of one or more portions of the individual's body, and further, that generates and presents a representation of the expressed emotion to the individual in real time. In this specification, an expressed emotion may reflect a natural, instinctive state of mind deriving from the individual's circumstances, mood, or relationships with other individuals, and may include, but are not limited to, anger, awe, desire, fear, grief, hate, laughter, and love. Further, one or more of the expressed emotions may be associated with a corresponding intensity. In certain implementations, described below, the presented representation may identify the expressed emotion, and its corresponding intensity, using terminology appropriate to the individual's language and cultural identity, and the presented representation may enable the individual to unlock and better understand not only the expressed emotion, but the underlying causes of that expressed emotion.

In this specification, an expressive, free-form movement may correspond to a movement of one or more portions of the individual's body that is modulated by an underlying, expressed emotion and thus, exhibits certain characteristics, such as movement shape, duration, speed, and/or direction, that are indicative of the underlying, expressed emotion. For example, an expression of anger by the individual may modify a time-evolving shape, duration, speed, and/or direction of an undifferentiated movement to a new shape, duration, speed, and/or direction indicative of the expressed anger. In some instances, and as described below, an expressive, free-form movement may respond to, and correspond to, an underlying expressed emotion, and the characteristics indicative of that underlying emotion may be exhibited through the movement of any portion of the individual's body, such the individual's fingers, the individual's head, or any additional or alternate body part or collection of body parts, including the individual's entire body.

The system may, for example, receive multidimensional data specifying the time-evolving, free-form movement of the one or more portions of the individual's body from various connected devices during a current collection period. The connected devices may include, but are not limited to, a communications device or smartphone operated by the user, a wearable, sensor-based device disposed on at least a portion of the individual's body, a sensor-based device embedded in one or more objects accessed by the individual, an Internet-of-Things (IoT) device in communication with the system, and any additional or alternate device capable of capturing data indicative of the free-form movement of the one or more portions of the individual's body during the current collection period. Additionally, the one or more portions of the individual's body may include one or more of the individual's fingers, the individual's head, or any additional or alternate body part or collection of body parts, including the individual's entire body, whose free-form motion may be captured by the various connected devices.

The system may, in some instances, process the received multidimensional data to derive feature values that characterize the free-form movement of the one or more portions of the individual's body at corresponding times within the current collection period, and further, may access predictive model data establishing predictive models that correlate the various emotions, and their intensities, with corresponding time-evolving patterns in the derived values of features that characterize body movements during prior collection periods. Based on an application of one or more pattern-recognition algorithms, machine-learning algorithms, and/or data analytics to the derived, time-evolving parameter values and to the predictive model data, the system may identify a corresponding one of the emotions expressed throughout the time-evolving movement of the one or more portions of the individual's body during the current collection period.

The system may generate and transmit data characterizing the corresponding emotion to a communications device of the individual, which may present a real-time representation of the corresponding emotion through a corresponding interface, such as a graphical user interface (GUI) or a voice-user interface (VUI). Additionally or alternatively, the system may share portions of the data characterizing the corresponding emotion with other individuals linked to the individual through a corresponding biomedia network. In some instances, the presented representation and/or the shared emotional data may enable the individual to explore and "unlock" his or her emotions and share these emotions among a tight network of friends, family, and co-workers and professionals, such as psychologists, nutritionists, and coaches.

In some instances, as described above, the individual's expressive, free-form movement may be modulated by a single emotion, such as anger, throughout the current application period. In other instances, the individual's expressive, free-form movement may be modulated by more than one emotion, and the application of the one or more pattern-recognition algorithms, machine-learning algorithms, and/or data analytics by the system may establish a "mixed" emotional state in which two or more emotions overlap during the expressive, free-form movement. By way of example, a first emotion may initially modulate the expressive, free-form movement, but may be interrupted by a second emotion that takes control of and/or interferes with the previous first emotion and modulates the rest of the individual's expressive, free-form movement. The resulting mixed emotion state, as established by the system, may commonly exist in individuals experiencing emotion disorders or high levels of mental or physical stress, and additionally or alternatively, may characterize unstable or hyperactive individuals. In further instances, the individual's expressive, free-form movement may be modulated by multiple "near-emotions," such as love, which is near and can evolve into grief (and vice versa), and anger, which is near and can evolve into hate (and vice versa).

In response to an identification of multiple emotions that modulate the individual's expressive free-form movement, the system may select a corresponding one of the identified emotions based on an assigned weighting scheme (for example, by assigning higher weights to emotions that are more unpleasant or more intense than other emotions) or based on a consistency with an operational mode of the system (for example, in the focused mode described below). The system may generate and transmit data characterizing the selected emotion to the communications device of the individual for real-time presentation to the individual, or may share portions of the data characterizing the selected emotion through the corresponding biomedia network, using any of the processes described herein.

In one implementation, a system includes one or more computers and one or more storage devices storing instructions that are operable, when executed by the one or more computers, to cause the one or more computers to perform operations that include, among other things, receiving, from a communications device, first data indicative of a first time-evolving movement of a portion of a body during a collection period, and obtaining second data correlating an expressed emotion with a second time-evolving movement of the portion of the body during each of a plurality of prior collection periods. The one or more computers may further perform the operations of applying at least one of a pattern recognition algorithm or a machine learning algorithm to portions of the first and second data, and based on an outcome of the application of the least one pattern recognition algorithm or machine learning algorithm, determining a corresponding one of the expressed emotions represented by the first time-evolving movement of the portion of the body during the collection period. The one or more computers may also perform operations that include transmitting data indicative of the corresponding one of the expressed emotions to the communications device. In some aspects, the communications device may be configured to present a representation of the corresponding one of the expressed emotions through a corresponding interface.

In certain aspects, the one or more computers further perform the operations of determining first feature values that characterize the first time-evolving movement during the collection period, and the second data may correlate corresponding ones of the expressed emotions with second feature values that characterize the second time-evolving movement during each of the prior collection periods. Further, the step of applying may include applying the at least one pattern recognition algorithm or machine learning algorithm to portions of the second data, and based on an outcome of the application of the at least one pattern recognition algorithm or machine learning algorithm, establishing ranges of the second features values that characterize each of the expressed emotions. In some instances, the step of determining may include establishing that the first feature values are consistent with a corresponding one of the established ranges of the second feature values, the corresponding one of the established ranges being associated with the corresponding one of the expressed emotions. In other aspects, the step of applying may include applying the at least one machine learning algorithm to portions of the first and second data, and based on an outcome of the application of the least one machine learning algorithm, the step of determining may include determining the corresponding one of the expressed emotions represented by the first time-evolving movement of the portion of the body during the collection period.

In further aspects, the communications device may be further configured to capture and transmit portions of the first data to the system without intervention from the user, and to present the representation of the corresponding one of the expressed emotions through the corresponding interface without intervention from the user. Additionally or alternatively, the step of receiving may include receiving first data from the communications device in response to at least one of a presentation of electronic content to the user or an attendance of the user at an event, the received first data identifying at least one of the presented electronic content or the event.

The one or more computers may also perform the operations of identifying linguistic elements that express the corresponding one of the expressed emotions within at least one of an additional language or an additional culture, and the step of transmitting may include transmitting additional data comprising the identified linguistic elements to the communications device. In some instances, the communications device may be configured to present a representation of the identified linguistic elements to a user through the corresponding interface. In additional instances, the one or more computers may perform the operations of receiving, from the communications device, a selection at least one of the identified linguistic elements by the user of the communications device, and associating the at least one selected linguistic element with the corresponding one of the expressed emotions.

In other aspects, the portion of the body may include a finger, the communications device may include a touchscreen display unit, the first time-evolving movement may include a plurality of first contacts established sequentially between the finger and the surface of the touchscreen display unit at corresponding first contact times during the collection period, and the first data may identify first contact positions, first contact pressures, and the first contact times associated with each of the first contacts during the collection period. Further, the one or more computers may perform the operations of accessing calibration data associated with a user of the communications device, modifying at least one of the first contact positions or first contact pressures in accordance with the accessed calibration data, and normalizing at least a portion of modified first contact positions or the modified first contact pressures in accordance with a predetermined normalization scheme.

Further, in some aspects, the second time-evolving movement may correspond to a plurality of second contacts established sequentially between the finger and the surface of the touchscreen display unit at corresponding second contact times during each of the prior collection periods, the second data may identify, for each of the prior collection periods, second contact positions, second contact pressures, and the second contact times associated with each of the second contacts. Additionally, the one or more computers may perform the operations of determining first feature values that characterize the first contacts during collection period, the obtained data may associate corresponding ones of the expressed human emotions with second feature values that characterize the second contacts during each of the prior collection periods, and the features may include at least one of a speed of the movement, acceleration associated with the movement, a contact duration, a change in contact pressure, or a finger size.

In additional aspects, the one or more computers may perform the operations of generating a plurality of graphical elements reflecting the first contacts at the corresponding first contact times during the collection period, establishing a graphical representation that includes the generated graphical elements, and transmitting data identifying the graphical representation to the communications device. The graphical elements may, in some instances, have corresponding visual characteristics established in accordance with the corresponding one of the expressed emotions, and the communications device may be configured to present the graphical representation to a user within a portion of the corresponding interface. The one or more computers may also perform the operations of obtaining digital image data, modifying a visual characteristic of at least a portion of the digital image data to reflect at least one of the first time-evolving movement of the portion of the human body during the collection period or the corresponding one of the expressed emotions, and transmitting the modified digital image data to the communications device.

In further aspects, the first data may include first positional data identifying at least one of (i) time-evolving spatial positions of or (ii) time-evolving forces applied to the portion of the body at corresponding times within the collection period. The communications device may include one or more devices configured to detect the at least one of the time-evolving spatial positions or the time-evolving forces at the corresponding times during the collection period, and the one or more devices may include at least one of a wearable device, a device embedded within the communications device, or a device embedded within an object.

In other aspects, the user may be a member of a biomedia network, the communications device may be configured to execute an application program associated with the biomedia network, and an executed application program may generate the corresponding interface for presentation by the communications device. The one or more computers may also perform the operations of obtaining data identifying members of a biomedia network, the identified members including the user and one or more additional users, the additional users being linked to the user and being permitted to access content associated with the user, and transmitting the data identifying the corresponding one of the expressed emotions to at least one of the additional users within the biomedia network. Additionally, in certain aspects, the one or more computers further perform the operations of receiving a request for the data identifying the corresponding one of the expressed emotions, the request being received through a programmatic interface, and in response to the request, transmitting at least a portion of the requested data through the programmatic interface.

In other implementations, corresponding devices, computer-implemented methods and computer programs may be configured to perform those steps performed by the example apparatus described above. One or more computer programs can be so configured by virtue of having instructions that, when executed by device, cause the device to perform the actions.

The details of one or more implementations of the subject matter described in this specification are set forth in the accompanying drawings and the description below. Other potential features, aspects, and advantages of the subject matter will become apparent from the description, the drawings, and the claims.

All sensors that capture movements, forces and touch areas of any body member with a sufficient freedom of expression provide the data the algorithms need to detect discrete pure or mixed emotions, their dimension, and their intensity level in a particular language, context and culture.

Sensors can be embedded in wearables (watch, digital shirts, gloves, shoes, etc.), mobile (phones, tablets, etc.) or any device (camera, chair, bed, television, etc.) that has the ability to measure and track movements, forces and touch areas with high spatial (0.5 mm) and temporal resolutions (1 ms).

Touch area measure increases the accuracy of the algorithms in detecting some of the emotions. Not all inputs highly correlate with all the emotions: some inputs are more valuable than others in detecting some emotions.

Body members include head, arms, hands, fingers, foots, the whole body, etc.

Examples of discrete pure emotions: anger, grief, awe, etc. Examples of mixed emotions: love and grief, anger and hate, etc.

Examples of emotional dimensions: valence, dominance, arousal, etc.

Examples of intensities for anger: disappointment is level 1, fury is level 5

Using a dynamic, always evolving, dictionary of emotions. The algorithms are very precise when selecting the right word to describe a detected emotion.

BRIEF DESCRIPTION OF THE DRAWINGS

FIGS. 1F, 1G, 1H, 1I, 1J, and 1K illustrate additional examples of a graphical user interface.

Like reference numbers and designations in the various drawings indicate like elements.

DETAILED DESCRIPTION

Figure 1A:
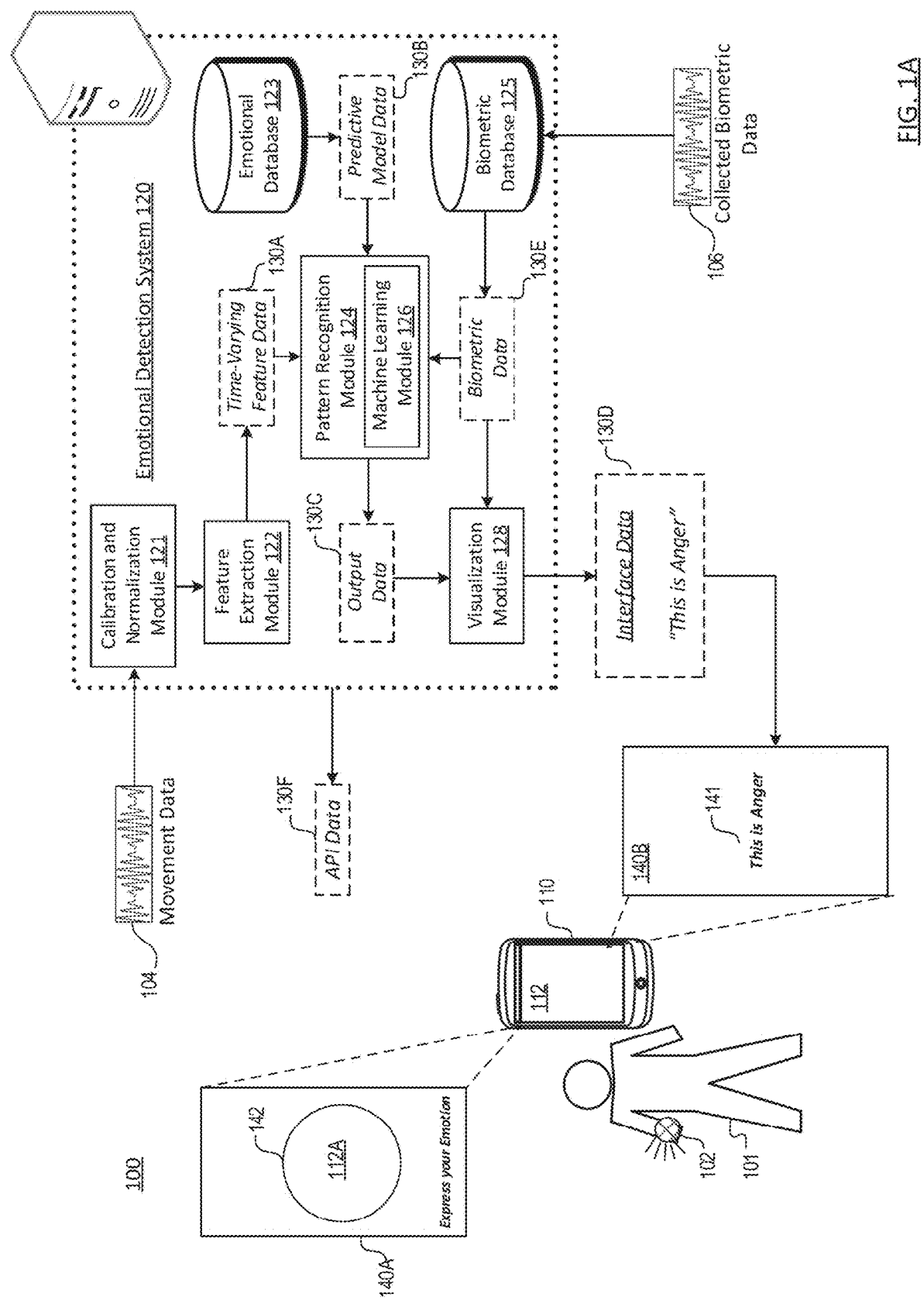
FIG. 1A is a diagram of an environment in which a computing system determine an emotion expressed by a time-evolving, free-form movement of a user's body during a collection period.

FIG. 1A illustrates an example environment 100 that determines and characterizes emotions represented by time-evolving, free-form movements of one of more portions of a user's body. Environment 100 may, in some aspects, include a sensor device 102, a client device 110, and an emotion detection system 120, which may be interconnected through any appropriate combination of communications networks, such as a wireless local area network (LAN), a "WiFi" network, a RF network, a Near Field Communication (NFC) network, a wireless Metropolitan Area Network (MAN) connecting multiple wireless LANs, and a wide area network (WAN). Further, sensor device 102 and client device 110 may also be connected directly through one or more short-range wireless or mesh networks, such as those established through Bluetooth™ communications protocols, NFC protocols, or optical communications protocols, which include infrared (IR) communications.

In some implementations, a component of environment 100, such as client device 110 or sensor device 102, may be configured to detect a time-evolving, free-form movement of one or more portions of a body 101 of a user that occurs within a current collection period. The current collection period may include a time period of predetermined or variable length, and the one or more portions of user body 101 may, for example, include an appendage, such as a finger, or a combination of appendages, such as user body 101, capable of expressing two- or three-dimensional movement without external control or constraint. In some instances, the time-evolving, free-form movement may be characterized by multi-dimensional spatial positions of the one or more portions of user body 101 at discrete detection times within the collection period, and further, by values of forces applied by or onto the one or more portions of user body 101 at the discrete detection times within the collection period. In certain aspects, the applied forces may be results from an activity of any muscle disposed within any portion of the individual's body, and the values of these obtained forces may represent measurements of the individual's muscular activity during the collection period taken by any of a number of sensor devices. For example, the applied forces may include, but are not limited to, a force applied by a portion of user body 101, such as a finger, onto an object, such as a surface of a touchscreen, and a tensile or compressive force experienced by muscles of user body 101, as indicated by a strength of a firm grip or a tension of a clenched jaw.

In one aspect, the time-evolving, free-form movement of the one or more portions of user body 101 may represent a deliberate action performed by the user, and client device 110 may be configured to detect and capture data indicative of the time-evolving spatial positions and the applied forces and/or muscular activity that characterize the deliberately performed, free-form movement at the discrete detection times within the current collection period. For example, the free-form movement may correspond to a movement of a finger of the user across a surface 112 of a touchscreen display of client device 110 during the current collection period, and client device 110 may be configured to detect and capture positional data indicative of positions of contact between the user's finger and the touchscreen display at the discrete detection times during the current collection period. In additional aspects, the touchscreen display may include a pressure-sensitive touchscreen display, and client device 110 may be configured to detect and capture applied-force data indicative of forces applied by the user's finger on touchscreen display surface 112 at each of the discrete detection times during the current collection period. For example, the captured applied-force data may include, but is not limited to, a value of a pressure applied by the user's finger onto touchscreen display surface 112 at each of the contact positions and the discrete detection times.

Client device 110 may, for example, provide portions of the captured positional and applied-force data to emotional detection system 120. Emotional detection system 120 may store information that identifies various predictive models, which may correlate a time-evolving movement of one or more portions of a human body with previously expressed, default emotions and their intensities. These default emotions may include, anger, awe, desire, fear, grief, hate, laughter, and love, and emotion detection system 120 may determine which of the default emotions are represented by the movement of the user's finger by applying these predictive models to the captured positional and applied-force data.

Figure 1B:
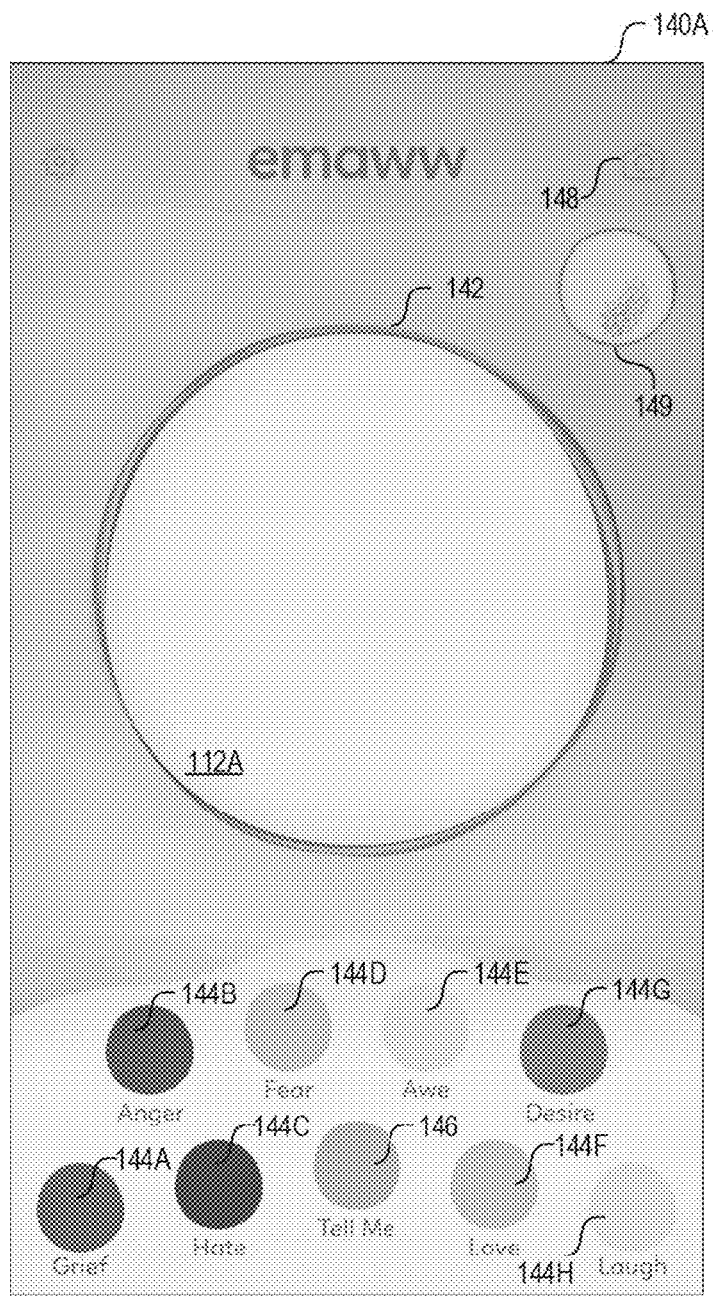
FIG. 1B illustrates an example of a graphical user interface.

Prior to providing input indicative of a current emotional state to client device 110, the user may perform one or more initial calibration processes that cause client device 110 to detect certain characteristics of the user and the device sensitivity and accuracy to the user's interactions with of the touchscreen display. In some instances, client device 110 may execute a stored application program, such as a mobile application provided by emotion detection system 120, which causes device 110 to present a graphical user interface (GUI) 140A to the user through the touchscreen display of client device 110. For example, as illustrated in FIG. 1B, presented GUI 140A may include an emotional interface 142, which may enclose a portion 112A of a surface 112 of the touchscreen display. In certain aspects, and upon installation of or an initial execution of the application by client device 110, GUI 140A may prompt the user to establish contact between the user's finger and surface portion 112A corresponding to emotional interface 142 and apply a maximum amount of pressure for a predetermined time period, such as five seconds. The detected range of applied pressures, including the detected maximum pressure, may characterize the sensitivity of the touchscreen display, its accuracy, and the user's interactions with of that touchscreen display, and client device 110 may package and transmit data identifying the detected range of applied pressures to emotion detection system 120. As described below, emotion detection system 120 may associate the received data with the user, store the received data as calibration data in an accessible data repository, and further, perform operations that calibrate additional portions of applied-pressure data generated by the user's operation of client device 110 in accordance with the detected maximum pressure.

If the user wants to record a known current emotional state, the user may input the emotional state into emotional interface 142 both by movement and selection of one of the emotional indicators, and emotion detection system 120 may provide feedback to the user as to whether the selected indicator indeed corresponds to the emotion indicated by the movement. In additional aspects, the user may provide the input to emotional interface 142 of GUI 140A in response to a recognized emotion, and additionally or alternatively, as an inquiry to characterize the user's current emotional state. By way of example, the user may have experienced a particularly taxing day at work, and may recognize that a current expression of anger results from that particularly taxing workday. In some instances, and as depicted in FIG. 1B, GUI 140A may also include emotional indicators 144A-144H associated with, respectively, the expressed emotions of anger, awe, desire, fear, grief, hate, laughter, and love, and the user may select, via the touchscreen display of client device 110, a corresponding one of emotional indicators 144A-144H associated with the user's known emotion. For instance, the user may select emotional indicator 144B, which represents the user's recognized expression of anger, by establishing contact between the finger and a portion of touchscreen display surface 112 corresponding to emotional indicator 144B. In some aspects, and in response to the selection of emotional indicator 144B, client device 110 may configure the executed application program to operate in accordance with a focused mode, and may associate the user's subsequent free motion of the finger within the emotional interface 142 during the collection period with data identifying the expressed emotion of anger.

In other aspects, the user may receive information that elicits an emotional reaction, but the user may be uncertain whether that emotional reaction represents an expression of anger, fear, or grief. In certain instances, and in response to the uncertainty, the user may provide the input to emotional interface 142 of GUI 140A in an effort to obtain data indicative of the actual emotion or emotions experienced by the user in response to the received information. For example, and as depicted in FIG. 1B, GUI 140A may include an emotional indicator 146 ("Tell Me") that associates any subsequent input to emotional interface 142 with the uncertain emotion and a request to identify that uncertain emotion. As described above, the user may select emotional indicator 146, which represents an uncertainty in the expressed emotion, by establishing contact between the finger and a portion of touchscreen display surface 112 corresponding to emotional indicator 146. In some aspects, and in response to the selection of emotional indicator 146, client device 110 may configure the executed application program to operate in accordance with an open mode, and may associate the user's subsequent free motion of the finger within the emotional interface 142 during the collection period with a request to identify the uncertain emotion or emotions represented by the free-form movement of the finger.

Figure 1D:
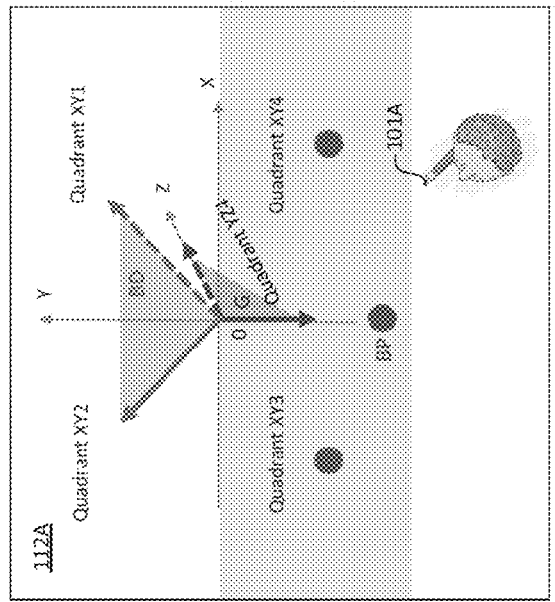
FIGS. 1C, 1D, and 1E depict examples of the time-evolving, free-form movement of a portion of the user's body.
Figure 1E:
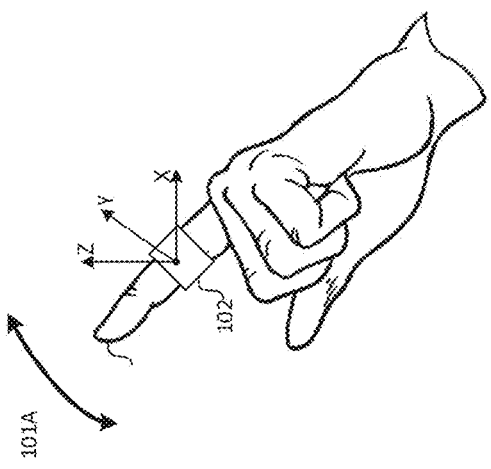
Figure 1C:
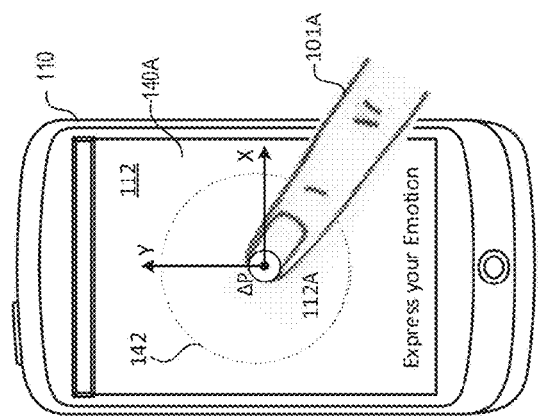

In some instances, upon a selection of an appropriate one of emotional indicators 144A-144H or emotion indicator 146, the user may provide the input to emotional interface 142 by establishing contact between the finger and surface portion 112A, and freely moving the finger along surface portion 112A within the emotional interface 142 during the collection period. For example, as illustrated in FIG. 1C, the user may establish contact between a finger 101A and surface portion 112A and may slide finger 101A across surface portion 112A during the collection period. Further, client device 110 may detect and capture portions of the positional data indicative of the two-dimensional contact position within surface portion 112A (in the "X" and "Y" directions of FIG. 1C) at each of the detection times during the collection period, and portions of the applied-force data indicative values of pressures applied to surface portion 112A by the user's finger (the ΔP of FIG. 1C) at each of the detection times during the collection period.

In some aspects, finger 101A may correspond to the user's middle finger, and as described in FIG. 1C, the user may establish contact between the middle finger and surface portion 112A and may slide the middle finger across surface portion 112A during the collection period. Establishing contact between the user's middle finger and surface portion 112A may, in certain instances, keep the user's hand balanced and facilitate an easy movement of the finger across surface portion 112A (without mechanical constraints) under a dominant modulation of the emotion. In some instances, the movement of the user's middle finger across surface portion 112A may filter mechanical noise more effectively than the movement of other finger, such as an index finger, and may facilitate a more effective and accurate detection of the expressed emotion (or emotions) by emotion detection system 120.

Additionally in certain aspects, client device 110 may capture additional data identifying a position of the user's body 101, a direction of the user's body 101, and a gravitational direction at each of the detection times during the collection period. For example, as illustrated in FIG. 1D, a three-dimensional coordinate system (such as "X" and "Y" axes along surface portion 112A and a "Z" axis perpendicular to surface portion 112A) may be centered at the two-dimensional contact position of finger 101A within surface portion 112A, and may decompose a plane established by the X and Y axes into four quadrants, such as quadrants "XY1," "XY2," "XY3," and "XY4." In one aspect, the user may hold client device in a hand, and when establishing contact between finger 101A and surface portion 112A and moving finger 101A across surface portion 112A, the position of the user body 101 (BP) may be oriented within quadrant XY4, the gravitational direction (G) may be oriented in a direction opposite to the Y axis, and the direction of user 101's body (BD) may be oriented towards the Y direction a maximum of deviation of −45° deviation. In other aspects, the values of BP, G and BD may vary depending on whether the user is left- or right-handed, and depending on an angle of client device 110 vis-a-vis the ground. For example, the position of user 101's body may be oriented anywhere inside quadrants XY3 or XY4, the direction of user 101's body may deviate up to ±45° around the Y axis, and/or the gravitational direction may deviate up to 90° from the Y axis towards the Z axis in a plane defined by the Y and Z axes.

Client device 110 may generate movement data 104 that includes the portions of the captured positional data and the captured applied-force data, and as described above, may include within movement data 104 information identifying a communications device that captured the positional or applied-force data, such as client device 110 or sensor device 102, information identifying a passive or active mechanism for data collection, and further, information identifying the user's configuration of the executed application in the focused mode or open mode, as described above. Additionally in certain aspects, movement data 104 may also include, but is not limited to, data identifying the position of the user's body 101, the direction of the user's body 101, and/or the gravitational direction at each of the detection times during the collection period. In certain aspects, client device 110 may transmit movement data 104 to emotion detection system 120, which as described below, may determine an actual emotion represented by the time-evolving, free-form movement of the user's finger across surface portion 112A during the current collection period based on an application of one or more predictive models to portions of movement data 104, and further, may provide data indicative of the actual expressed emotion to client device 110 in accordance with the configured focused or open mode of operation.

In certain implementations, described above, the user may deliberately input a time-evolving, free-form movement of the user's finger within emotional interface 142 to express and confirm the identity of a known emotion, and additionally or alternatively, to obtain feedback identifying or characterizing an uncertain emotional state. In other implementations, a sensor device operated, held, or worn by the user, such as sensor device 102, may be configured to passively detect and capture data indicative of the time-evolving, free-form movement of the one or more portions of user body 101 during the current collection period, and additionally or alternatively, data indicative of applied forces associated with muscular activity that results from the time-evolving, free-form movement during the collection period, without intervention from the user. For example, sensor device 102 may include one or more positional sensors, such as global positioning system (GPS) sensors, configured to capture positional data indicative of a time-evolving, three-dimensional spatial position of the one or more portions of user body 101 during the collection period. Additionally or alternatively, sensor device 102 may also include one or more force sensors configured to capture applied-force data indicative of a time-evolving force applied by or onto the one or more portions of user body 101 during the collection period. Further, in some instances, sensor device 102 may also include a digital camera capable of capturing digital images that characterize time-evolving, three-dimensional spatial position of the one or more portions of user body 101 during the collection period. In additional aspects, sensor device 102 may include additional components that store the captured positional and applied-force data, and transmit portions of movement data 104 that include the captured positional and applied-force data to emotion detection system 120 during or upon completion of the collection period.

By way of example, sensor device 102 may include a wearable sensor device, such as a fingertip sensor device, a connected smart ring or pendant (such as a Ringly™ or a SmartyRing™), a smart watch or wristband (such as an Apple Watch™ or a Fitbit™ wristband), an optical head-mounted display unit (such as Google Glass™), and/or smart fabrics having embedded electrical and sensor components (such as Sensoria™ socks). In other examples, sensor device 102 may be embedded in one or more objects accessible to or utilized by the user, such as a chair or other piece of furniture, and additionally or alternatively, sensor 102 may be incorporated or embedded within one or more communications devices, such as client device 110. For instance, as illustrated in FIG. 1D, sensor device 102 may include a connected smart ring worn on finger 101A of the user, and sensor device 102 may be configured to capture and store time-evolving, three-dimensional positional data (spatial positions in "X," "Y," and "Z" directions of FIG. 1D) resulting from a free-form movement of the user's finger during the current collection period.

In some instances, and as described above, sensor device 102 may incorporate portions of the stored time-evolving, three-dimensional positional data (and additionally or alternatively, time-evolving applied-force data) within movement data 104, which sensor device 102 may transmit to emotion detection system 120 during or upon completion of the collection period without intervention from the user. In other instances, sensor device 102 may transmit portions of movement data 104 to client device 110 across the short-range or mesh network, and client device 110 may transmit collected movement data 104 to emotion detection system 120 using any of the processes described above. Further, and as described above, movement data 104 may also include data that identifies a position of the user's body 101, a direction of the user's body 101, and/or a gravitational direction, as captured or derived by sensor device 102 throughout the current collection period Emotion detection system 120 may determine an actual expressed emotion represented by the time-evolving, free-form movement of the user's finger during the collection period based on an application of one or more predictive models to portions of movement data 104, and further, may provide data indicative of the actual expressed emotion to client device 110 for presentation within a corresponding interface.

In other implementations, sensor device 102 may also include one or more biometric sensors configured to capture data, such as biometric data, indicative of a physiological state of the user during the collection period, and further, additional components that store the captured biometric data and transmit portions of captured biometric data to emotion detection system 120 at various times during and after the collection period. By way of example, sensor device 102 may detect, capture, and store biometric data identifying a heart rate of the user, a respiration rate of the user, a blood pressure of the user, and/or a body temperature of the user at various times during the collection period, and sensor device 102 may transmit portions of the stored, time-evolving biometric data as biometric data 106 to emotion detection system 120 during or upon completion of the collection period.

In some implementations, emotion detection system 120 may receive portions of movement data 104 from client device 110 and additionally or alternatively, from sensor device 102. Movement data 104 may, in some aspects, include positional data and applied-force data that characterize a time-evolving, free-form movement of one or more portions of user body 101 at discrete detection times within a collection period. For instance, and as described above, the time-evolving, free-form movement may correspond to a movement of a finger of the user across a surface 112 of a pressure-sensitive, touchscreen display of client device 110 during the current collection period. In some aspects, the positional data may include, but is not limited to, two-dimensional positions of contact between the user's finger and touchscreen display surface at the discrete detection times during the current collection period, and the applied-force data may include, but it not limited to, a value of a pressure applied by the user's finger onto touchscreen display surface 112 at each of the contact positions and the discrete detection times. Further, as described above, the movement of the user's finger may be deliberately applied across touchscreen display surface 112, and movement data 104 may include information that identifies the configuration of the executed application in the focused mode or open mode by the user, such as though the selection by the user of interface indicators 144A-144H and 146 of FIG. 1B.

Emotion detection system 120 may, in certain aspects, perform operations that calibrate portions of movement data 104 in accordance with one or more user-specific calibration parameters, such as a maximum value of applied pressure that characterizes the movement of the user's finger across surface 112, and that normalize movement data 104 such that values of spatial position and calibrated applied pressure range from zero to unity. In some aspects, emotion detection system 120 may process portions of the normalized and calibrated movement data to derive time-evolving values of one or more features that characterize the free-form movement of the user's finger across touchscreen display surface 112 during the collection period, and further, may apply one or more pattern-recognition algorithms to portions of the derived feature values and to emotion-specific predictive models that correlate a time-evolving movement of one or more portions of a human body with previously expressed, default emotions and their intensities. Based on an outcome of the application of the one or more pattern recognition algorithms, emotion detection system 120 may determine a corresponding one of the default emotions, and further, a corresponding one of the intensities, that represents the time-evolving, free-form movement of the user's finger across touchscreen display surface 112 during the collection period. In certain aspects, described below, emotion detection system 120 may transmit data indicative of the determined default emotion and additionally or alternatively, the determined intensity, to client device 110 for presentation to the user through a corresponding interface, such as a GUI or VUI.

Referring back to FIG. 1A, and upon receipt of movement data 104 from client device 110 or sensor device 102, a calibration and normalization module 121 of emotion detection system 120 may perform operations that calibrate portions of movement data 104 to reflect one or more characteristics of the user and the user's operation of client device 110 or sensor device 102. For example, and as described above, client device 110 may capture calibration data indicative of a maximum pressure applied to touchscreen display surface 112 during a corresponding calibration period, and may transmit the captured calibration data to emotion detection system 120, which may associate the calibration data with the user and client device 110, and store the calibration data in an accessible data repository, such as emotion database 123. In some aspects, calibration and normalization module 121 may access the portions of the store calibration data, and may calibrate portions of movement data 104, such as the applied-force data, in accordance with the maximum pressure applied by the user during the calibration process. For example, as described above, the applied-force data captured by client device 110 may include values of pressure applied to portions of touchscreen display surface 112 by the user's finger at discrete detection times during the current collection period, and calibration and normalization module 121 may calibrate the applied-force data by dividing each of the applied pressure values by the maximum applied pressure value to generate calibrated values of the applied pressures ranging from zero to unity at the discrete detection times within the current collection period. In other aspects, calibration and normalization module 121 may calibrate any additional or alternate portion of movement data 104 to reflect or account for any additional or alternate characteristic of the user and/or the user's operation of client device 110 and sensor device 102.

In additional aspects, calibration and normalization module 121 may also perform operations that normalize portions of movement data 104. For example, movement data 104 may include positional data that identifies two-dimensional positions of contact between the user's finger and touchscreen display surface 112 at the discrete detection times during the current collection period. Additionally, calibration and normalization module 121 may access portions of the stored calibration data to obtain device information characterizing transverse (along the "X" direction in FIG. 1C) and longitudinal (along the "Y" direction in FIG. 1C) dimensions of touchscreen display surface 112. In certain aspects, calibration and normalization module 121 may perform operations that normalize the two-dimensional components of the contact positions, which client device detected at the discrete times within the current collection period, based on corresponding ones of the transverse and longitudinal dimensions of touchscreen display surface 120. In other implementations, calibration and normalization module 121 may normalize other portions of collected movement data 104 in accordance with additional or alternate normalization schemes appropriate to the portions of movement data 104 collected by client device 110 and sensor device 102.

Emotion detection system 120 may, in certain aspects, process portions of movement data 110, as normalized and calibrated above, to derive values of various features that characterize the time-evolving movement of one or more portions of user body 101 during the current collection period. For example, a feature extraction module 122 may access portions of the normalized positional data and calibrated applied-force data to identifying the normalized, two-dimensional contact positions and calibrated applied-pressure values at each of the discrete detection times during the current collection period. Feature extraction module 122 may, in some instances, compute "micro-differences" in two-dimensional position (for example, differences in the "X" dimension and the "Y" dimension of FIG. 1C), and applied pressure between each of the discrete detection times, and based on the computed micro-differences, derive values of one or more features that characterize the time-evolving movement of the user's finger during the current collection period. For example, the one or more derived features values may include, but are not limited to: a speed of the user's finger at each of the discrete detection times; an acceleration of the user's finger at each of the discrete detection times; a displacement of the user's finger during successive pairs of the discrete detection times; a direction of the movement of the user's finger at each of the discrete detection times; a change in the calibrated pressure during successive pairs of the discrete detection times; an area of contact between the user's finger touchscreen display surface 112 at each of the discrete detection times; and a shape of a movement of the user's finger along touchscreen display surface 112 during the current collection period.

The disclosed implementations are, however, not limited to these examples of derived feature values, and based on a composition of calibrated and normalized movement data 104, feature extraction module 122 may perform operations that derive one or more additional feature values that characterize the movement of the one or more portions of user body 101, including the whole of user body 101, during the collection period. For example, these additional derived values may include, but are not limited to: metrics indicative of the user's posture; metrics indicative of a body-zone associated with client device 110 or sensor device 102; data identifying a particular sensor device that captured portions of movement data 104; spatial positions of the one or more portions of user body 101 normalized in accordance with characteristic dimensions or movements in multiple dimensions, such as the "X," "Y," and "Z" directions of FIG. 1D; calibrated values of forces applied to various portions of user body 101, such as forces imposed on various muscles; and number of movements-per-second during the expressive, free-form movement of the one or more portions of user body 101. Further, in some aspects, feature extraction module 122 may derive additional feature values based on any combination of the feature values described above, such as values of angular momentum of the user's finger or values of torque applied to the various portions of user body 101.

Feature extraction module 122 may also generate feature data 130A, which identifies the derived feature values that characterize the movement of the user's finger at discrete detection times during the current collection period, and emotion detection system 120 may provide feature data 130A as an input to a pattern recognition model 124. In some aspects, pattern recognition module 124 may detect time-evolving patterns within the derived feature values based on an application of one or more pattern-recognition algorithms to feature data 130A, and based on an application of emotion-specific predictive models to the detected time-evolving patterns of the derived feature values, pattern recognition module 124 may determine an expressed default emotion represented by the free-form movement of the user's finger during the collection period.

For example, emotion detection system 120 may include a structured emotional database 123 having data records that store predictive model data establishing the emotion-specific predictive models, which may correlate a free-form movement of one or more portions of user body 101 and bodies of other individuals during prior collection periods with corresponding ones of a set of default emotions, and further, with corresponding intensities of the default emotions. As described above, the default emotions may include, but are not limited to, anger, awe, desire, fear, grief, hate, laughter, and love, and for each of the emotions, the predictive models will further output a corresponding range of intensities.

In some instances, an expression of a specific emotion by a human being, such as the default emotions described above, may be associated with a corresponding physiological and bio-mechanical response, which may be common across humans of any age, sex, or size. For example, the user described above may express an emotion, such as anger, through a movement of one or more portions of user body 101, which may be characterized by time-evolving patterns in a combination of feature values derived from movement data calibrated and normalized using any of the processes described above. These time-evolving patterns in the combination of derived features values may, in some aspects, not only characterize the user's expression of anger, but may also characterize a movement of one or more body parts by any additional or alternate individual during an expression of anger.

In some aspects, the time-evolving patterns in the combination of derived feature values that express anger, and additionally or alternatively, any of the other default emotions described above, may be empirically determined based on laboratory observations of human subjects expressing emotions under strict conditions. These empirically determined, time-evolving patterns may be processed using various statistical techniques to generate one or more predictive models that correlate time-evolving patterns in various combinations of the derived feature values to each of the default emotions identified above, such as anger, awe, desire, fear, grief, hate, laugh, and love. For example, the predictive models for the expression of anger may include a first predictive model that correlates the expressed anger to time-evolving patterns in two-dimensional values of normalized finger speed (the "X" and "Y" directions of FIG. 1C), values of finger direction, and changes in calibrated pressure, and a second predictive model that correlates the expressed anger to time-evolving patterns in three-dimensional values of normalized finger speed, acceleration, and displacement (the "X," "Y," and "Z" directions of FIG. 1D).

Further, each of generated, emotion-specific predictive models may be associated with a corresponding set of input data, such as the combinations of two-dimensional finger speed, two-dimensional finger direction, and changes in calibrated pressure for the first predictive model described above, and the combinations of three-dimensional finger speed, acceleration, and displacement for the second predictive model described above. In view of the specific sets of input data, each of the generated predictive models may also be associated with corresponding sensor and communications devices, such sensor device 102 and client device 110, configured to capture movement data that enables emotion detection system 120 to derive the specific sets of input data. For example, emotion detection system 120 may apply the first predictive model for expressed anger to movement data captured by client device 102, but not to movement data captured by sensor device 102, which is incapable of detecting and capturing data indicative of the applied pressure between the user's finger and touchscreen display surface 120 during the collection period.

Additionally, in some aspects, the predictive models described above may correlate intensities characterizing corresponding ones of the default emotions with time-evolving patterns in ranges of the derived feature values. For example, the expression of anger may be associated with five intensity levels of increasing strength, such as annoyance (level one), frustration (level two), anger (level three), rage (level four), and fury (level 5), and the predictive models for the expression of anger may correlate each of these five levels to a range of the corresponding derived feature values. In other implementations, predictive models for the expression of each of the other default emotions, such as awe, desire, fear, grief, hate, laugh, and love, may also be associated with multiple level of intensities, and the predictive models for these other default emotions may correlate each of the intensity levels to a range of the corresponding combinations of the derived feature values.

The predictive models described above may also correlate time-evolving patterns in ranges of the derived feature values with multiple types or forms of an expressed emotion, which themselves may be associated with multiple intensities. By way of example, and for the expression of anger, the predictive models may include correlations that characterize forms of anger that include, but are not limited to, boiling anger and exploding anger. In some instances, and to facilitate a detection of exploding anger based on the expressive, time-evolving, free-form movement of the user's finger across touchscreen display surface 112, one or more of the predictive models may specify inputs that include, but are not limited to, a number of discrete contacts between the user's finger and touchscreen display surface 112 (which correspond to discrete "touches") per during the collection period, a duration of each of the touches, a direction of movement associated with each of the touches, a speed associated with each of the touches, an acceleration or accelerations associated with each of the touches, an overall applied pressure associated with each of the touches, and/or a maximum pressure recorded during each of the touches.

Additionally, and in order to detect an intensity of the boiling anger (and/or the exploding anger, any other form of anger, and/or other expressed emotions), the predicted models described above may establish five intensity levels associated with corresponding intervals of derived feature values, which include, but are not limited to, corresponding intervals of applied pressure, corresponding intervals of the number of touches per second, corresponding intervals of speed, and corresponding intervals of touch duration. By way of example, the minimum and maximum values of the applied pressure, the number of touches per second, the speed, and the touch duration, which characterize the intensities of boiling anger, may be established based on prior experimental and empirical data, and may evolve and be adaptively modified as emotion detection system 120 collects and stores additional data, for example, through an application of one or more adaptive or machine learning processes that generate the maximum and minimum derived values the establish these intervals.

Referring back to FIG. 1A, emotional database 123 may store data that specifies each of the generated predictive models for the default emotions of anger, awe, desire, fear, grief, hate, laughter, and love. For example, the stored data may specify, for a corresponding one of the predictive models, the default emotion and corresponding intensities, the combination of derived feature values that serve as inputs to the corresponding predictive model, the time-evolving patterns in the combination of derived feature values correlated to the default emotion, and the ranges of the derived feature values that are correlated to the intensities of the default emotion, such as the intensities of annoyance, frustration, anger, rage, and fury described above.

In some aspects, emotion detection system 120 may access emotional database 123, and based on the derived feature values included within feature data 130A, identify one or more of the predictive models whose inputs are consistent with the derived feature values included within feature data 130A. For example, feature data 130A may include time-evolving values of two-dimensional finger speed, two-dimensional finger direction, and calibrated pressure changes, and emotion detection system 120 may identify predictive models for the default emotions that accept, as input data, the time-evolving values of the two-dimensional finger speed, two-dimensional finger direction, and calibrated pressure changes. Emotion detection system 120 may obtain portions of the stored data that specify each of the identified predictive models, and generate predictive model data 130B that includes the obtained data portions. Further, in some instances, emotion detection system 120 may provide predictive model data 130B as an input to pattern recognition model 124.

In some implementations, pattern recognition module 124 may receive input data that includes, but is not limited to, feature data 130A and predictive model data 130B. For example, and as described above, feature data 130A may include derived feature values that characterize the movement of the user's finger at discrete detection times during the collection period, and predictive model data 130B may include data establishing predictive models that correlate the default emotions and their intensities with corresponding time-evolving patterns in the derived values of the two-dimensional finger speed, two-dimensional finger direction, and calibrated pressure changes during the collection period. Pattern recognition module 124 may, in certain aspects, apply one or more pattern recognition algorithms to portions of feature data 130A and predictive model data 130B, and based on an outcome of the application of the one or more pattern recognition algorithms, pattern recognition module 124 may determine one of the default emotions and corresponding intensities represented by the free-form movement of the user's finger across touchscreen display surface 112 during the collection period, and may generate output data indicative of the determined default emotion and the corresponding intensity.

By way of example, the one or more pattern recognition algorithms may include one or more data mining algorithms and data analytics, which pattern recognition module 124 may apply to portions of feature data 130A. Through the application of the one or more data mining algorithms and/or data analytics to the portions of feature data 130A, pattern recognition module 124 may identify time-evolving patterns in the derived feature values that characterize the free-form movement of the user's finger across touchscreen display surface 112 during the current collection period. For instance, feature data 130A may include the derived values of the two-dimensional finger speed, two-dimensional finger direction, and calibrated pressure changes during the current collection period, and based on the application of the one or more data mining algorithms and/or data analytics, establish time-evolving patterns within these derived feature values throughout the current collection period.

Pattern recognition module 124 may also apply the each of the established predictive models, which may be specified within predictive model data 130B, to the time-evolving patterns in the derived feature values. For example, and as described above, the established predictive models may correlate corresponding ones of the default emotions (and corresponding intensities) to ranges of values of the two-dimensional finger speed, two-dimensional finger direction, and calibrated pressure changes derived during prior collection periods. Based on the application of these predictive models, pattern recognition module 124 may correlate the time-evolving patterns in the two-dimensional finger speed, two-dimensional finger direction, and calibrated pressure changes derived during the current collection period with a corresponding one of the default emotions, and further, an intensity of the corresponding default emotion.

In some aspects, the one or more pattern recognition algorithms may include one or more machine learning algorithms, such as decision-tree learning algorithm, and a machine learning module 126 may apply the one or more machine learning algorithms to portions of feature data 130A and predictive model data 130B. For example, feature data 130A may include derived values of the two-dimensional finger speed, two-dimensional finger direction, and calibrated pressure changes during the current collection period, and predictive model data 130B may establish, among other things, predictive models that correlate the default emotions and corresponding intensities to ranges of time-evolving values of the two-dimensional finger speed, two-dimensional finger direction, and calibrated pressure changes derived during prior collection periods. In certain instances, and based on an application of the one or more machine learning algorithm to the portions of feature data 130A and predictive model data 130B, machine learning module 126 may correlate the derived time-evolving feature values associated with the current collection period with a corresponding one of the ranges of the time-evolving feature values derived during prior collection periods, which may be associated with a particular default emotion and corresponding intensity.

Based on the application of the one or more pattern recognition algorithms to portions of feature data 130A and predictive model data 130B, pattern recognition module 124 may determine the default emotion and corresponding intensity represented by the time-evolving free-form movement of the user's finger during the current collection period. For example, the user may follow a particular sports team, such as the Washington Capitals™, and the current collection period may include a time period during which the user watches the Washington Capitals™ lose a pivotal playoff game. In some instances, pattern recognition module 124 and additionally or alternatively, machine learning module 126, may determine that the derived, time-evolving values of finger speed, finger acceleration, and calibrated pressure changes included within feature data 130A correspond to an expression of anger by the user and further, that an intensity of the expressed anger corresponds to an intensity of level two, such as frustration. Emotion detection system 120 may, in some aspects, populate output data 130C with information identifying the determined emotion and corresponding intensity, such as the expression of anger having an intensity corresponding to frustration. In additional aspects, emotion detection system 120 may also populate output data 130C with portions of collected movement data 104 (such as contact times and two-dimensional contact positions) and portions of feature data 130A (such as time-evolving finger speed, finger acceleration, and/or pressure variations).

In certain aspects, pattern recognition module 124 may provide output data 130C to visualization module 128, which may generate interface data 130D, that includes textual or graphical data describing the determined emotion and corresponding intensity represented by the time-evolving free-form movement of the user's finger across touchscreen display surface 112 during the current collection period. In some instances, a composition of generated interface data 130D may depend on a number of factors, which include, but are not limited to, a device that captured portions of movement data 104, a determination as to whether that device captured the portions of movement data 104 actively or passively, and when the device actively captured the portions of movement data 104, a determination as to whether the user configured the device and emotional detection system 120 to operate in a focused or open mode.

For example, and as described above, the user may experience an uncertain emotional state, and may select an interface element of a corresponding interface presented by client device 110 (such as "Tell Me" interface element 146 of GUI 140A of FIG. 1B) to configure client device 110 to actively capture input reflective of the uncertain emotional state in an open mode. Client device 110 may, in some instances, detect and capture data indicative of the deliberate, free-from movement of the user's finger across surface portion 112A corresponding to emotional interface 142 during the current collection period, and may associate the captured data with information identifying the selected open mode of operation, and transmit movement data 104 that includes portions of the captured data, the associated information, and an identifier of client device 110 to emotion detection system 120 as a request to identify the uncertain emotion or emotions represented by the free motion of the finger. In other examples, sensor device 102 may be configured to passively detect and capture data indicative of the time-evolving, free-form movement of the user's finger during the corresponding collection period without intervention from the user, and may transmit movement data 104 that includes portions of the passively captured data and an identifier of sensor device 102 to emotion detection system 120, as described above.

In other instances, and as described above, the user may recognize a currently experienced emotion, such as anger, and may select an interface element associated with the recognized emotion within GUI 140A (for example, one of emotional indicators 144A-144H associated with, respectively, the expressed emotions of anger, awe, desire, fear, grief, hate, laughter, and love) to configure client device 110 to actively capture input reflective of the recognized emotion in a focused mode of operation. As outlined above, client device 110 may detect and capture data indicative of the deliberate, free-from movement of the user's finger across surface portion 112A during the current collection period, and may associate the captured data with information identifying the focused mode of operation and the recognized emotion. Client device 110 may also transmit movement data 104 that includes portions of the captured data, the associated information, and an identifier of client device 110 to emotion detection system 120, as described above.

In some aspects, emotion detection system 120 may determine the device that captured portions of movement data 104, such as client device 110 or sensor device 102, and based on the associated information, determine whether the device captured the portions of movement data 104 actively or passively. Further, in response to a determination that client device 110 actively captured the portions of movement data 104, emotion detection system 120 may determine whether the user configured client device 110 to operate in the open or focused modes described above.

For example, emotion detection system 120 may determine that client device 110 actively captured portions of movement data 104 while operating in the open mode or alternatively, emotion detection system 120 may determine that sensor device 102 passively captured the portions of movement data 104. In some aspects, emotion detection system 120 may associate the determined emotion and corresponding intensity, such as anger and frustration, with the user and with feature values derived from the portions of movement data 104, as included within feature data 130A, and store data identifying the user, the determined emotion and corresponding intensity, and the derived feature values in a portion of emotional database 123. Further, in certain aspects, visualization module 128 may include, within interface data 130D, textual data that identifies the determined emotion and corresponding intensity, layout data specifying a position of the textual data within the graphical user interface (GUI) presented by client device 110, and further, interface characteristics, such as text color, background color, interface skin, etc., that enable the user to visually perceive the corresponding emotion within the presented GUI. For example, emotion detection system 120 may store data associated particular emotions with corresponding default background colors (for example, data associated anger with a red background, laughter with a yellow background, etc.), and visualization module 128 may populate a portion of interface data 130D with data identifying the red background color associated with determined anger.

Emotional detection system 120 may transmit portions of interface data 130D to client device 110 across any of the networks described above, and client device 110 may render portions of interface data 130D for presentation within a portion of a GUI 140B. As illustrated in FIG. 1A, GUI 140B may include interface element 141, which includes textual data specifying that the free-form movement of the user's finger during the current collection period expressed anger with an intensity of frustration (for example, "This is Anger"), and may also establish an interface background color appropriate to the expressed emotion and corresponding intensity, such as the red background corresponding to anger having an intensity of frustration. In some aspects, the presentation of the textual data within GUI 140B may facilitate the user's identification of the emotion and corresponding intensity that characterize the user's uncertain emotional state, and additionally or alternatively, may provide the user with feedback identifying the user's expressed emotions and the intensities of these emotions. The identification of these actively or passively expressed emotions may allow the user to better understand a current emotional state, and further, to identify the physiological or environmental factors that contribute to these emotional states.

In other instances, emotion detection system 120 may determine that client device 110 actively captured portions of movement data 104 while operating in the focused mode. Emotion detection system 120 may, for example, parse movement data 104 to identify the user's recognized emotion (such as anger, as indicated by the selection of interface element 144B of FIG. 1B), and may determine whether that recognized emotion matches the determined emotion. If, for example, emotion detection system 120 were to determine that the recognized emotion corresponds to the determined emotion, such as anger, emotion detection system 120 may store data associating the user, the determined emotion and corresponding intensity, and the derived feature values in a portion of emotional database 123, and may generate and transmit interface data 130D that identifies the determined emotion and corresponding intensity to client device 110 using any of the processes described above. In some instances, client device 110 may present, to the user through GUI 140B, data that identifies the determined anger with the corresponding intensity of frustration, and confirm the user's recognition of the current emotional state and the target emotion.

Emotion detection system 120 may, however, determine that the recognized emotion does not correspond to the determined emotion. In some instances, the user may have provided input to GUI 140A that identifies grief as a currently expressed emotion (for example, as indicated by the selection of interface element 144A of FIG. 1B), but emotion detection system 120 may determine that anger corresponds to the expressed emotion represented by the free-form movement of the user's finger during the current collection period. Emotion detection system 120 may, for example, ignore the user's request to associate the recognized or target emotion, such as grief, with the user's freeform movement during the time period, and may decline to store data in emotional database 123 that associates the recognized target emotion with the derived feature data indicative of the user's free-form movement during the collection period. Further, in some aspects, visualization module 128 may generate and transmit to client device 110 portions of interface data 130D that identify the discrepancy between the user's recognized emotion and the actual determined emotion, and prompt the user to provide additional free-form movement that represents the expressed emotion of grief to emotional interface 142, as described above.

In certain implementations described above, emotion detection system 120 may assign a particular linguistic representation of an emotion, such as the term "anger," to a pattern of features values that characterize the free-form movement of the user's finger during a current collection period. Although contextually relevant and meaningful to the user, the assigned linguistic representation may not convey an appropriate meaning to individuals that speak language a different from that spoken by the user, or that identify with cultures different from that of the user. For example, while a user in the United States may understand the contextual relevance of expressed anger and may be capable of characterizing his or her own feelings as being angry, a user who is unfamiliar with the English language may recognize the term "anger," but may lack an understanding sufficient to characterize his or her feelings as "angry."

In an effort to address the cultural and linguistic variations in terms describing expressed emotions, emotion detection system 120 may maintain an emotion dictionary that links together various linguistic representations of the default emotions across cultures, languages, and geographic regions. The emotion dictionary may, for example, include data identifying the default emotions, such as anger, awe, desire, fear, grief, hate, laughter, and love, and intensity levels and intensities associated with each of the default emotions. For example, the default emotion of anger may be associated with five increasing levels of intensity, represented by the terms annoyance (level one), frustration (level two), anger (level three), rage (level four), and fury (level 5). The emotion dictionary may, in some aspects, include synonyms for each of the default emotions, and further, for each of the intensities. For example, the emotion dictionary may identify "irritation" as a synonym for the default emotion of anger, and may further identifying "vengefulness" as a synonym for the fury, which represents a level-five intensity. Emotion detection system 120 may store data establishing the emotion dictionary within a corresponding portion of an accessible data repository, such as emotional database 123, and may link together data that identifies the default emotions, the intensities associated with corresponding intensity levels for each of the default emotions, and the synonyms for each of the default emotions and intensities.

For example, upon determination of the default emotion and the corresponding intensity level represented by the free-form movement of the user's finger across the portion of touchscreen display surface 112 during the current collection period, emotion detection system 120 may access portions of the stored emotion dictionary and obtain data records associated with the default emotion of anger. These obtained data records may include intensities associated with each intensity level of the default emotion of anger, and synonyms for the default emotion of anger and each of the intensities. For instance, and as described above, emotion detection system 120 may determine that the user's free-form movement represents an expression of anger having a level-two intensity, which the emotion dictionary characterizes as frustration. Further, motion detection system 120 may obtain, from the stored emotion dictionary synonyms of the determined default emotion of anger, which include the term "irritation," and synonyms for the intensity of frustration, which include the term "chagrin." In some aspects, visualization module 128 may populate interface data 130D with the obtain data identifying the terms, or linguistic elements, that represent the default emotion (anger), the intensity (frustration), and synonyms of the default emotion and intensity (such as irritation and chagrin), and may transmit populated interface data 130D to client device 110 using any of the processes described above for presentation to the user through a corresponding interface.

For example, client device 110 may present textual data identifying the default emotion and corresponding intensity, such as anger and irritation, along with textual data identifying the synonyms of the default emotion and corresponding default intensity, within the corresponding interface, such as GUI 140B of FIG. 1A. Additionally, in some aspects, interface data 130D may also identify additional interface elements, such as a text box, that enables the user to provide input to client device 110 identifying an additional or alternate term representing the default emotion or the corresponding default intensity. For instance, client device 110 may present the text box at a predetermined position within the corresponding interface (not depicted in FIG. 1A), and the user may provide input to touchscreen display surface 112 identifying additional or alternate terms that represent the default emotion of anger or the corresponding intensity of frustration. Client device 110 may transmit data identifying the additional or alternate terms to emotion detection system 120, which may link the additional or alternate terms to an appropriate default emotion or intensity within portions of emotional database 123 associated with the emotional dictionary.

In other implementations, and in addition to textual descriptions of the default emotions and corresponding default intensities determined by emotion detection system 120, emotion detection system 120 may also generate graphical representations that indicate, to the user, the determined default emotion and the corresponding intensity represented by the user's free-form movement during the current collection period. For example, as illustrated in FIG. 1E, GUI 140B may include a textual description 141 of the determined default emotion, such as anger, and may include a graphical representation 143 of the default emotion of anger and the corresponding intensity of frustration within emotional interface 142.

In some aspects, graphical representation 143 may include a plurality of graphical elements 143A having visual characteristics that correspond to the determined default emotion of anger and additionally or alternatively, the determined intensity of frustration. Emotion detection system 120 may, in certain instances, store data within emotion database 123 that assigns default shapes corresponding combinations of default emotions and default intensities, and that correlate characteristics of these default shapes with corresponding ones of the derived feature values, such as multi-dimensional values of finger speed, directions of movement, and changes in applied pressure, at corresponding detection times within the current collection period. For example, emotion detection system 120 may assign graphical elements shaped as triangles to the default emotion of anger and the default intensity of frustration. Further, the stored graphical-element data may correlate variations in a particular color, such as red, with particular variations in the derived feature values.

Emotion detection system 120 may, in some instances, process portions of movement data 104 and feature data 130A to identify two-dimensional contact positions within emotional interface 142 at corresponding detection times, and further, to associate subsets of the derived feature values with corresponding ones of the identified two-dimensional contact positions and detection times. For example, emotion detection system 120 may identify a value of a finger speed, a finger direction, and a change in applied pressure associated with each pair of contact positions and detection times. Further, in certain aspects, emotion detection system 120 may generate a graphical element, such as a red, triangle-shaped graphical element, for each pair of contact positions and detection times, and may modify the visual characteristics of the generated graphical elements based on corresponding ones of the derived feature values. For example, emotion detection system 120 may linearly vary a brightness of the red color of each of the generated graphical element in accordance with magnitude of the derived finger speed and derived change in applied pressure at each of the contact positions and detection times. The disclosed implementations are not limited to these examples of graphical elements, visual characteristics, and modifications, and in other implementations, emotion detection system 120 may assign any additional or alternate graphical element to the determined anger and the determined intensity of frustration, to the other intensity levels associated with anger, or to any other combination of default emotions and corresponding default intensities. Further, emotion detection system 120 may also modify any additional or alternate visual characteristic of the generated graphical elements, such as shape, etc., to reflect any of the derived feature values described above.

In some aspects, emotion detection system 120 generate graphical element data that specifies a shape, such as a triangle, an assigned color, such as red, and default dimensions associated with the generated graphical elements. Emotion detection system 120 may also generate layout data assigning each of the generated graphical elements, having visual characteristics modified above, to corresponding ones of the contact positions within emotional interface 142, and may generate orientation data that orients a vertex point of each triangle-shaped graphical elements in the direction of finger movement at the corresponding contact position within emotional interface 142. Emotion detection system 120 may, in certain aspects, transmit portions of the graphical element data, layout data, and orientation data to client device 110, which may process the received graphical element data, layout data, and orientation data and present graphical representation 143 within emotional interface 142 of GUI 140B, as illustrated in FIG. 1F.

Further, GUI 14B may also include an "Effect" interface element 145A, which upon selection by the user, may cause client device 110 to present an effects dashboard 147A to the user within GUI 140B. For example, effects dashboard 147 may include additional interface elements that enable the user to specify default visual characteristics for graphical representation 143 (such as "Normal" in FIG. 1F), or to modify a contrast of, include noise within, or blur portions of graphical representation 143. The disclosed implementations are not limited to these example modifications to the default visual characteristics, and in other implementations, effect dashboard 147 may include interface elements facilitating any additional or alternate modifications, including user-defined modifications, to the visual characteristics of graphical representation 143.

In some instances, as illustrated in FIG. 1F, the user may also provide input to client device 110 selecting a "Comment" interface element 1456, which may cause client device 110 to generate and present a text box 147B within GUI 140B. For example, and as described above, the user may provide, via client device 110, textual or voice input to text box 1476 that specifies one or more additional or alternate terms or phrases that represent the default emotion of anger (or the default intensity of frustration) within the user's language, culture, or geographic region. The textual input may also describe a context of the expressed emotion (such as the expressed anger), add more meaning to the expressed emotion, and additionally or alternatively, share a story behind the expressed emotion. In some instances, client device 110 may transmit data indicative of the additional or alternate terms or phrases to emotion detection system 120, which may associate the additional or alternate terms or phrases with the default emotion of anger or the default intensity of frustration, and store data indicative of the associated with a portion of emotional data 123 corresponding to the emotion dictionary, as described above.

Further, as illustrated in FIG. 1G, the user may also provide input to client device 110 selecting a "Share" interface element 145C, which may cause client device 110 to generate and present a sharing dashboard 147C within GUI 140B. For example, effects dashboard 147A may include additional interface elements identifying various platforms within which the user may share the determined default emotion, such as anger, the determine default intensity, such as frustration, and image data corresponding to graphical representation 143. For example, these platforms may include a web-based email platform, such as Gmail™, a chat service, such as Google Hangout™, a social networking service, such as Facebook™ or Google+™, and email and messaging platforms native to client device 110. In other aspects, described below, the user may provide input to client device 110 (for example, by selecting an additional interface element within sharing dashboard 147C) that, upon transmission to emotion detection system 120, causes emotion detection system 120 to provide data identifying the determined emotion of anger, its corresponding intensity of frustration, and the image data corresponding to graphical representation 143 with additional users linked to the user within a biomedia network, as described below.

For example, emotion detection system 120 may establish a biomedia network that enables the user to explore his or her own emotions expressed during prior collection periods and to share data identifying these emotions, along with selected digital image and video content, with one or more additional users, such as colleagues, friends, family, professionals, and organizers of various events. For example, emotion detection system 120 may store, within a portion of an accessible data repository, biomedia network data that identifies one or more users and entities associated with the biomedia network (such as the user, the additional users, etc.) and links and connections between the various users and entities.

In some instances, the user (and additionally or alternatively, any other user of the biomedia network) may provide input to client device 110, and may access a web page or digital portal associated with the biomedia network maintained emotion detection system 120 using any of the processes described above. For example, the accessed web page or digital portal, when accessed by the user and presented by client device 110, may identify one or more additional users of the biomedia network or entities associated with the biomedia network. In certain instances, the user may provide input, via client device 110, to the web page or digital portal that selects a subset of the additional users (such as close friends, family, and various professionals) and requests a connection with each of the subset of the additional users within the biomedia network. Client device 110 may package and transmit portions of the provided input to emotion detection system 120, which may perform operations to establish the requested connections. In certain aspects, and in response to the established connections, emotion detection system 120 may perform operations that share the user's identity with each of the connected additional users through the web page or digital portion associated with the biomedia network.

In other instances, the accessed web page or digital portal may also provide an interface that enables the user to establish and/or modify one or more user preferences and configuration settings that define the user's interaction with the biomedia network. For example, the user may provide input to client device 110 that establishes one or more emotions or groups of emotions as private, that establishes groups of linked users capable of accessing certain emotions expressed by the user and/or content viewed or shared by the user, and additionally or alternatively, that enables the user to share certain emotions or types of content anonymously among the users of the biomedia network. Client device 110 may package and transmit portions of the provided input to emotion detection system 120, which may perform operations that associate the established preferences and configuration settings with profile data for the user, and store data identifying the established preferences and configuration settings within a corresponding portion of the accessible data repository.

Additionally, in certain aspects, emotion detection system 120 may establish one or more default configuration settings for the biomedia network, which may be modified or re-configured using any of the processes described above. By way of example, emotion detection system 120 may establish default configuration settings that enable users to share emotions and other types of content anonymously within the biomedia network, and further, that enable users to follow anonymously the emotions and content shared across the biomedia network. For instance, a first user may "follow" the anonymously shared emotions and content of a second user without requesting or establishing a connection with that second user, and the first user may view representations of the emotions and content shared by the anonymous second user within a corresponding web page or digital portal associated with the biomedia network. As described above, the first and second users may remain mutually anonymous, and emotion detection system 120 may reveal the identity of the first user to the second user, and vice versa, upon establishment of a connection between the first and second users using any of the processes described above.

In some implementations, the first user may correspond to a professional (such as a psychologist, a nutritionist, a coach, or a stand-up comedian) and additionally or alternatively, a governmental, regulatory, or an entity (such as an advertisement agency, a school, a data agency, a movie studio, or a manufacturer of wearable devices). For example, a psychologist may follow the emotions and content shared by an anonymous user of the biomedia network, and in response to an observation of particularly unpleasant emotion shared by that anonymous user, provide input to web page or digital portal of the biomedia network that requests a connection with the anonymous user through any of the processes described above. In some aspects, by requesting and establishing the connection with the anonymous user, the psychologist may identify the anonymous user and offer the identified user assistance in managing the particularly unpleasant emotion and in mitigating any unpleasant behaviors that gave rise to or result from the particularly unpleasant emotion.

In additional implementations, emotion detection system 120 may receive, from a user of the biomedia network, a request to track the emotions, content, and/or physiological data shared by one or more additional users within the biomedia network. The request may, for example, identify the additional users of the biomedia network (such as individuals, groups of individuals sharing common demographic, professional, or educational characteristics, etc.) and may establish a duration of the requested track (such as particular, limited tracking period or an open-ended duration). In response to the received request, emotion detection system 120 may establish and implement various tracking activities (i.e., a "tract") that monitor and capture the shared emotions, content, and/or physiological data of the additional users, and may provide time-evolving representations of the shared emotions, content, and/or physiological data within web pages and digital portals accessible to the requesting user (i.e., the "owner" of the tract). In some aspects, the established and implemented tract may capture the emotions, content, and/or physiological data shared by a subset of the users that agree to participate in the requested tracking activities (for example, by providing input to emotion detection system 120 that evinces the agreement), and emotion detection system 120 may provide various financial or non-financial incentives (which may include, but are not limited to, a provision of funds, a discount or coupon, and a product or a service) to the additional users in exchange for their participation in the requested tract, The presented portions of the captured emotions, content, and/or physiological data may be structured to offer insight to the owner of a tract on the emotions, issues, or preferences of the tracked additional users, and the owner of the tract (and other users authorized by the owner) may explore the collected and aggregated data in real-time or offline. For example, an employer may provide, to emotion detection system 120, a request to establish a tract that monitors the shared emotions and physiological characteristics of a demographically diverse group of employees throughout a workday. The request may include, but is not limited to, data identifying each of the monitored employees (such as identifier of the employees within the biomedia network, demographic characteristics of the employees, etc.) a duration or scope of the tract (such as each weekday between 9:00 a.m.

and 5:00 p.m.), and data identifying the owner of the tract (such as the employer's identifier within the biomedia network).

Emotion detection system 120 may establish the requested tract and may capture emotions, content, and/or physiological characteristics shared by the identified group of employees during the specified time periods, and may provide representations of the employees' emotions, content, and/or physiological data within a web page or digital portal accessible to the employer. The representations may include, but are not limited to, raw emotional or physiological data captured at discrete time periods, graphical representations (e.g., scatter plots) indicative of the time-evolution of the employees' emotional or physiological data, and any additional or alternate graphical, audible, or textual representation that conveys, to the employer, the emotions, content, and/or physiological data shared by the group of employees during specified time periods.

In some examples, the established tract may correspond to a health or well-being tracking event, which may be established by a professional to monitor the emotions, shared content, and/or physiological data of one or more protégés. The professional may, for instance, correspond to a life coach, a mentor, a psychologist or counselor, or a nutritionist, and the tract request may include data identifying each of the professional's protégés within the biomedia network. In response to the received request, and using any of the processes described above, emotion detection system 120 may establish the requested tract and may prompt each the protégés to freely express their emotional states (for example, by freely sliding a finger within an emotional interface, such as emotional interface 142 presented by client device 110) at discrete detection times. As described above, emotion detection system 120 may capture the emotions freely expressed by the protégés (along with shared content and/or detected physiological data), and may provide representations of the protégés' freely expressed emotions, content, and/or physiological data within a web page or digital portal accessible to the professional. In some aspects, the professional may access and view the presented data to enable the professional to better serve these protégés or to collect data for research.

In other aspects, a user may request that emotion detection system 120 establish a tract that monitors the user's own emotions, content, and/or physiological data shared across the biomedia network. For example, the user may desire a deeper understand the emotions or physiological conditions that drive the user's consumption of a particular food product, such as chocolate. In some aspects, the user may provide, through the web page or digital portal of the biomedia network, a request that emotion detection system 120 establish a tract that monitors an occurrence of a particular expressed emotion, such as desire, at various times on a daily basis. Emotion detection system 120 may, in response to the request, collect data indicative of the detected occurrences of the user's expressed desire for chocolate, along with corresponding physiological data, and may present representations of the user's detected desire for chocolate and/or physiological data within a web page or digital portal accessible to the user. As described above, the presented representations may characterize a time-evolution of the user's expressed desire for chocolate, and the physiological conditions underlying that expressed desire, and may enable the user to better understand and control his or her consumption of chocolate.

Figure 1K:
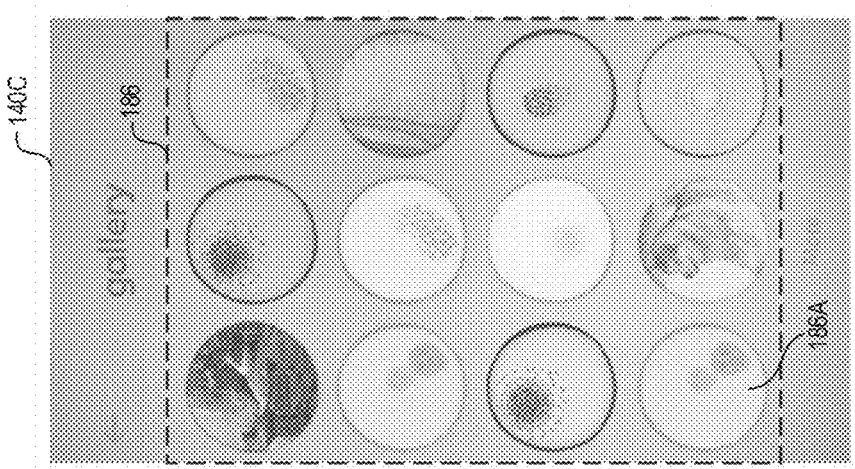
Figure 1J:
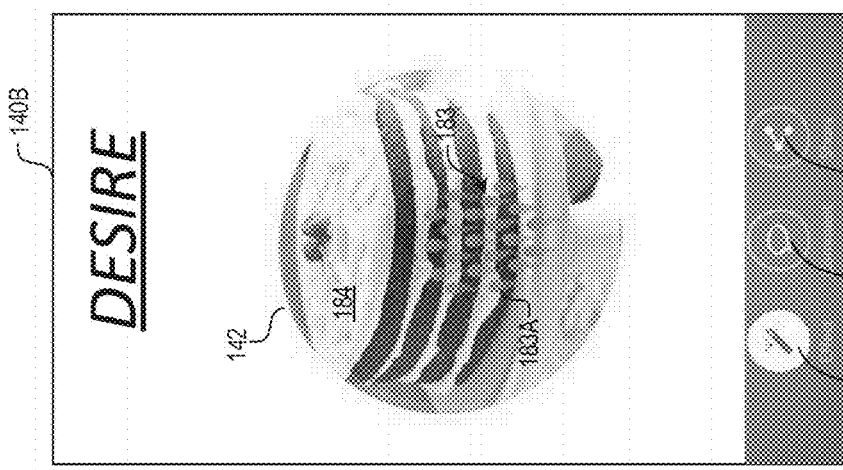
Figure 1I:
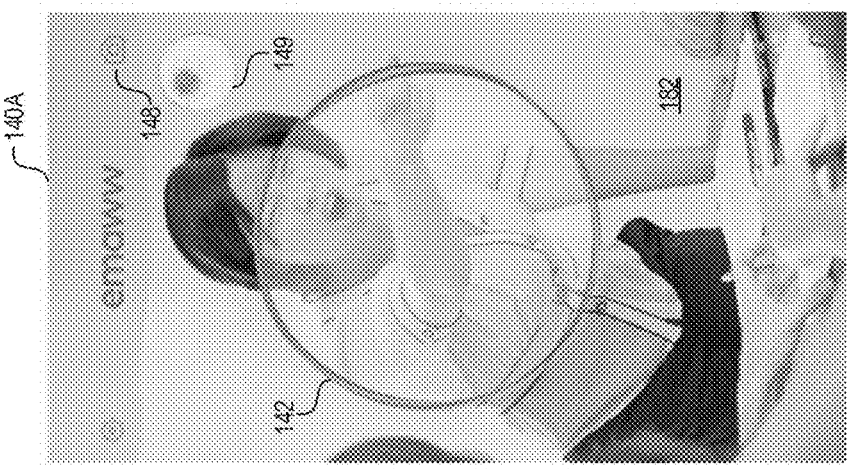

Referring back to FIG. 1B, emotional interface 142 may also include interface element 148, which may correspond to an icon that, upon selection by the user, activates a digital camera (such as a front-facing camera) incorporated into client device 110. For example, the user may select interface element 148 by establishing contact between the finger and a portion of touchscreen display surface 112 corresponding to interface element 142, and in response to the selection, client device 110 may activate the front-facing camera incorporated within client device 110. Additionally, user may touch, tap, or otherwise establish contact between a finger and a portion of touchscreen display surface 112 corresponding to emotional interface 142, which may cause the front-facing camera to automatically capture an image of the user and/or the user's surroundings. In some aspects, as depicted in FIG. 1I, client device 110 may present a portion 182 of the captured image within a corresponding graphical user interface, such as GUI 140A, and using any of the processes described above, the user may provide input to emotional interface 142 that causes emotion detection system 120 to associate an expressed emotion with the captured image.

In other aspects, the user may provide input to GUI 140A that causes client device 110 to access a data repository of previously captured images, such as a library of stored photos captured by one or more additional applications executed by the client device, and present at least a portion of the previously captured images for user selection within a corresponding graphical user interface, such as GUI 140A. The user may, in some instances, select one or more of the images for presentation within GUI 140A, and using any of the processes described above, may provide input to emotional interface 142 indicative of an expressed emotion associated with the presented image.

For example, the user may be grieving over a recently deceased pet, and may provide input to client device 110 that selects an image of that pet for presentation within GUI 140A. In some aspects, and using any of the processes described above, the user may provide input to emotional interface 142 that causes emotion detection system 120 to associate an expression of grief with the presented image of the user's recently deceased pet. In other examples, the user may provide input selecting an image of a particular food desired by the user for presentation within GUI 140A, such as an image of a cake, and the user may provide input to emotional interface 142 that expresses the user's desire for the cake using any of the processes described above.

In additional aspects, and as described above, visualization module 128 may generate, and provide to client device 110, interface elements that graphically represent the emotion expressed through the user's free-form movement, as input into emotional interface 110 in response to the presented image. For example, and as described above, the user may input free-form movement into emotional interface 142 that reflects a desire for a particular food product, such as a cake. In some instances, as illustrated in FIG. 1J, client device 110 may present an image 184 of the cake within emotional interface 142 of a corresponding graphical user interface, such as GUI 140B, and may superimpose a graphical representation 183 of the default emotion of desire and its corresponding intensity onto image 182 within emotional interface 142 (for example, as generated by emotion detection system 120 using any of the processes described above). As described above, graphical representation 183 may include a plurality of graphical elements 183A having visual characteristics that correspond to the determined default emotion of desire and additionally or alternatively, a determined intensity of that desire, and visualization module 128 may generate and provide the interface elements that establish and transmit the graphical representation to client device 110 using any of the processes described above. In other instances, emotion detection system 120 may generate data specifying additional or alternate representations of the expressed emotion, such as an audible representation or a tactile representation, which may be provided to client device 110 and present to the user through a corresponding interface, such as an audio interface or a tactile interface embedded within or in communication with client device 110.

In some aspects, the user may provide input to GUI 140B that selects "Effect" interface element 185A, which enables emotion detection system 120 to apply and present to the user one or more user-specified or default visual effects using any of the exemplary processes described above. For example, these user-specified or default visual effects may include, but are not limited to, an application of various color filters, an application of various distortion effects, an application of various zoom-in and zoom-out effects, an application of one or more fade-in and fade-out effects, and/or a presentation of moving shapes representing the expressive movement of the emotion. In other aspects, and using any of the processes described above, the user may provide input to GUI 140B that provides a comment on the emotion, the image, and/or the graphical representation (for example, by selecting "Comment" interface element 185B) or that requests emotion detection system 120 share the emotion, the image, and/or the graphical representation among user of a biomedia network (for example, by selecting "Share" interface element 185C).

In further implementations, and in reference to FIGS. 1B and 1I, GUI 140A may also include interface element 149 that graphically represents a prior emotion expressed by the user through input provided to emotional interface 142. In some aspects, the user may provide input to GUI 140A that selects interface element 149, and client device 110 may transmit data indicative of the selection to emotion detection system 120. In response to the transmitted data, visualization module 128 may generate additional interface elements that graphically represent the free-form movement indicative of one or more prior emotions expressed by the user, and may transmit the additional interface elements to client device 110 for presentation within a corresponding graphical user interface. For example, as illustrated in FIG. 1K, client device 110 may present the additional interface elements within GUI 140C, and the presented additional interface elements may establish a gallery 186 representative of a subset of the user's prior expressed emotions with additional or alternate data identifying a date or time of expression. In some aspects, the user may provide input to GUI 140C that selects a corresponding one of the interface elements associated, such as element 186A that graphically represents a particular prior emotion, and client device 110 may present the graphical representation of the emotion associated with selected interface element 186A within an additional interface, which may allow the user to applying visual effects to the graphical representation, comment on the emotion or the graphical representation, and/or share the emotion of the graphical representation within the biomedia network, as described above.

Using any of the exemplary processes described above, emotion detection system 120 may determine that the time-evolving, free-form movement of the user's finger during the current collection period represents an expression of anger having a corresponding intensity level of frustration. In certain aspects, emotion detection system 120 may access portions of the stored biomedia network data, and identify one or more additional users that are linked to the user and permitted by the user to access data indicative of the user's expressed anger. Emotion detection system 120 may transmit or "push" data indicative of the user's expression of anger to each of the identified additional users through the biomedia network. Further, in additional aspects, emotional detection system 120 may transmit, to the each of the additional users through the biomedia network, additional data that provides context or meaning to the user's expression of anger, such as digital image or video content provided by the user, portions of electronic content that elicited the expressed anger, and/or biometric data characterizing the user's physiological state during the collection period, such a biometric data captured by sensor device 102. As described above, the additional users may access the data indicative of the user's expression of anger, and additionally or alternatively, the data providing context or meaning to that expression, by accessing a web page or digital portal associated with the biomedia network and maintained by emotion detection system 120.

In other examples, the user may access the web page or digital portal associated with the biomedia network, e.g., using client device 110, and may provide input to client device 110 indicative of an attendance at a particular scheduled event. In some aspects, by connecting to the event within the biomedia network, an organizer of the event may create a "tract" that tracks and captures data indicative of the user's emotions during various portions of the event, and additionally or alternatively, data indicative of the emotions of any other users connected to the event within the biomedia network, using any of the processes described above. The organizer of the event may, for example, provide the user and/or the other users with a financial reward or non-financial reward (e.g., discounts on future events, etc.) for providing the data indicative of their emotions to the organizer in real-time or in near-real-time.

In certain implementations, and as described above, emotion detection system 120 may generate and transmit textual or graphical interface data to client device 110 that describes a expressed emotion, such as anger, and a corresponding intensity, such as frustration, represented by a free-form movement of the user's finger during the current collection period, and client device 110 may present a representation of that emotion within a corresponding graphical user interface, such as GUI 140B. In further instances, and in addition to the textual or graphical data describing the user's current emotional state, emotion detection system 120 may also generate and transmit additional interface data indicative of the user's physiological state during the current collection period, which client device 110 may present within a portion of GUI 140B concurrently with the textual and graphical data indicative of the expressed emotion and corresponding intensity.

As described above, sensor device 102 may include one or more biometric sensors configured to capture biometric data indicative of a physiological state of the user during the current collection period, and further, additional components that store the captured biometric data and transmit portions of captured biometric data to emotion detection system 120 at various times during and after the current collection period. By way of example, sensor device 102 may detect, capture, and store biometric data identifying the user's heart rate, the user's respiration rate, the user's blood pressure, or the user's body temperature at various times during the collection period, and sensor device 102 may transmit biometric data 106 to emotion detection system 120 during or upon completion of the collection period using any of the processes described above. In some aspects, sensor device 102 may continue to capture biometric data indicative of the user's physiological state at additional times, and may passively transmit portions of the captured biometric data to emotion detection system 120 at various transmission times without input from the user.

Emotion detection system 120 may, in certain instances, store portions of biometric data 106 within data records of a structured biometric database 125. For example, each data record of biometric database 125 may store portions of collected biometric data 106 that are associated with the corresponding collection time. In some aspects, emotion detection system 120 may access biometric database 125 and obtain biometric data 130E characterizing the user's physiological state during the current collection period. As described above, biometric data 130E may include values of the user's heart rate, respiration rate, a blood pressure, and/or a body temperature at one or more collection times during the current collection period. Biometric data 130E may also include baseline values of one or more of the user's biometric characteristics, such as a value of the user's resting heart rate or respiration rate, which may be determined by emotion detection system 120 and maintained within biometric database 125.

In some instances, emotion detection system 120 may provide biometric data 130E as an input to visualization module 128, which may generate and transmit to client device 110 additional interface data that characterizes the physiological state of the user during the current collection period. Visualization module 128 may generate portions of the additional interface data that include average values of the user's heart and respiration rates during the current collection period and additionally or alternatively, ranges of the user's heart and respiration rates during the current collection period. In other instances, the additional interface data may also identify the user's resting heart rate or respiration rate. Emotion detection system 120 may transmit the additional interface data to client device 110, and client device 110 may present a representation of the user's physiological state during the current collection period in conjunction with the representation of the determined emotion and corresponding intensity. For example, by viewing the presented representations of both the determined emotion and the user's corresponding physiological state, such as an average heart rate and respiration rate, the user may further understand the physiological indicators of expressed emotion and may better understand and control an emotional response to various situations and circumstances.

In other aspects, visualization module 128 may also generate additional interface data to reflect occurrences of various events prior to and during the current collection period. For example, and as described above, GUI 140A may prompt the user to provide input free-form movement of the user's finger along a portion of touchscreen display surface 112 while the user views a particular segment of streaming digital video content, and movement data 104 may include information identifying the particular segment of streaming digital video content viewed by the user. In certain aspects, visualization module 128 may generate additional interface data that identifies the particular segment of the streaming digital video content viewed by the user (which elicited the determined emotion), and emotion detection system 120 may transmit the additional interface data to client device 110 for presentation to the user in conjunction with the representation of the determined emotion and corresponding intensity. The concurrent presentation of a representation of the user's expressed emotion and corresponding intensity with biometric data characterizing the user's physiological state during the current collection period may enable the user to better physiological factors leading to the expressed emotion, and further, that result from the expressed emotion.

By way of example, a first user may be connected to a second user within the biomedia network, may observe a particular emotion, such as anger, shared by that second user. In some aspects, the first user may provide data to emotion detection system 120 that requests the second user express anger, which emotion detection system 120 may present to the second user within a corresponding graphical user interface presented by client device, such as GUI 140A presented by client device 110. The data presented within GUI 140A may prompt the second user to express anger within emotional interface 142, and client device 110 may capture movement data indicative of the expressed anger and transmit that captured movement data to emotion detection system 120. Emotion detection system 120 may determine whether the movement data corresponds to the expression of anger using any of the processes described above, and visualization module 128 may generate and transmit interface data that identifies the determined correspondence to client device 110 for presentation within the corresponding graphical user interface, such as GUI 140B. The presentation of data indicative of the determined correspondence to the second user may enable the second user to better understand his or her current emotional state and the physiological conditions that drive that current emotional state.

In other implementations, the first user may access a web page or other digital portal associated with the biomedia network (as presented by a corresponding device, such as client device 110), and may view a graphical representation of the second user's expressed emotions through a corresponding emotional interface. Further, the first user may react to the second user's expressed emotions by performing small and unique actions that, among other things, express the first user's care and kindness. In certain aspects, the accessed web page or digital portal may present a profile page of the first user within the biomedia network, and the profile page may include icons that represent one or more metrics indicative of the actions performed by the first user in response to emotions expressed by the second user.

By way of example, the one or more metrics may include, but are not limited to, smiles, cheers, hugs, sympathies, empathy, time, and help, and emotion detection system 120 may determine values of each of these metrics (which may be graphically represented by the corresponding icons) based on the first user's actions within the biomedia network. For instance, emotion detection system 120 may determine values of the smiles, cheers, hugs and sympathies metrics based a number of times the first user responded to an expressed emotion (for example, by selecting a corresponding one of the presented icons). In further instances, emotion detection system 120 may determine the empathy metric based on an amount of text written by the first user in response to emotions expressed by other users of the biomedia network, may determine the time metric based on a duration of a chat or messaging session in which the first user listened and interaction within another user of the biomedia network, and additionally or alternatively, may determine the help metric based on a number of the users of the biomedia network that rated a particular one of the first user's interactions as being helpful and supportive. In some aspects, the determined metrics may improve a quality of communications between users of the biomedia network, and presenting icons representative of the determined metrics (such as within corresponding profile pages) may foster competition between the users for improved communication and interaction.

In further examples, emotion detection system 120 may obtain data identifying occurrences of various external events, such as current weather conditions, current news headlines, or current stock reports, during the current collection period. For instance, emotion detection system 120 may determine a geographic location of the user based on an IP address associated with client device 110 or based on portions of movement data 104, and may obtain data from one or more external computing systems data that identifies a weather condition at the user's geographic location during the current collection period. Visualization module 128 may generate additional interface data that identifies the external event, such as the weather condition at the user's geographic location, and emotion detection system 120 may transmit portions of the additional interface data to client device 110 for presentation to the user in conjunction with the representation of the determined emotion and corresponding intensity. In some aspects, and as described above, the concurrent presentation of a representation of the user's expressed emotion and corresponding intensity, and events that elicit or occurred during the expression of that emotion may enable the user to better contextualize and understand the factors leading to the expressed emotion during the current collection period.

Additionally, in certain implementations, emotion detection system 120 may maintain code establishing one or more programmatic interfaces, such as application programming interfaces (APIs), that enable third-party developers to connect various application programs with emotion detection system 120 and integrate into these application programs one or more of the processes to detect emotions from force and free-form expressive movements, as described herein. Emotion detection system 120 may, in some aspects, provide data establishing a set of these programmatic interfaces, such as API data 130F, to one or more third-party application developers, who may link the programmatic interface to application programs executed across a variety of mobile and stationary computing platforms, Using any of the processes described above, emotional detection system 120 may determine an emotion represented by a time-evolving, free-form movement of a portion of an individual's body. Emotion detection system 120 may, for example, receive data specifying the time-evolving, free-form movement during a collection period, and may process the received data to derive values of feature that characterize the free-form movement at corresponding times within the collection period. Emotion detection system 120 may also access emotion-specific predictive models that correlate a time-evolving movement of one or more portions of a human body with previously expressed default emotions and their intensities during prior collection periods, and based on an application of one or more pattern-recognition algorithms, machine-learning algorithms, and/or data analytics to the derived, time-evolving parameter values and to the emotion-specific predictive models, emotion detection system 120 may identify a corresponding one of the default emotions represented by the free-form movement during the collection period. Emotion detection system 120 may generate and transmit data characterizing the corresponding emotion to a communications device of the individual, which may present a representation of the corresponding emotion through an interface, such as a graphical user interface (GUI) or a voice-user interface (VUI). In certain implementations, described below, the presented representation may identify the corresponding emotion using terminology appropriate to the individual's language and cultural identity, and the presented representation may enable the individual to unlock and better understand not only the expressed emotion, but the underlying causes of that expressed emotion.

Figure 2:
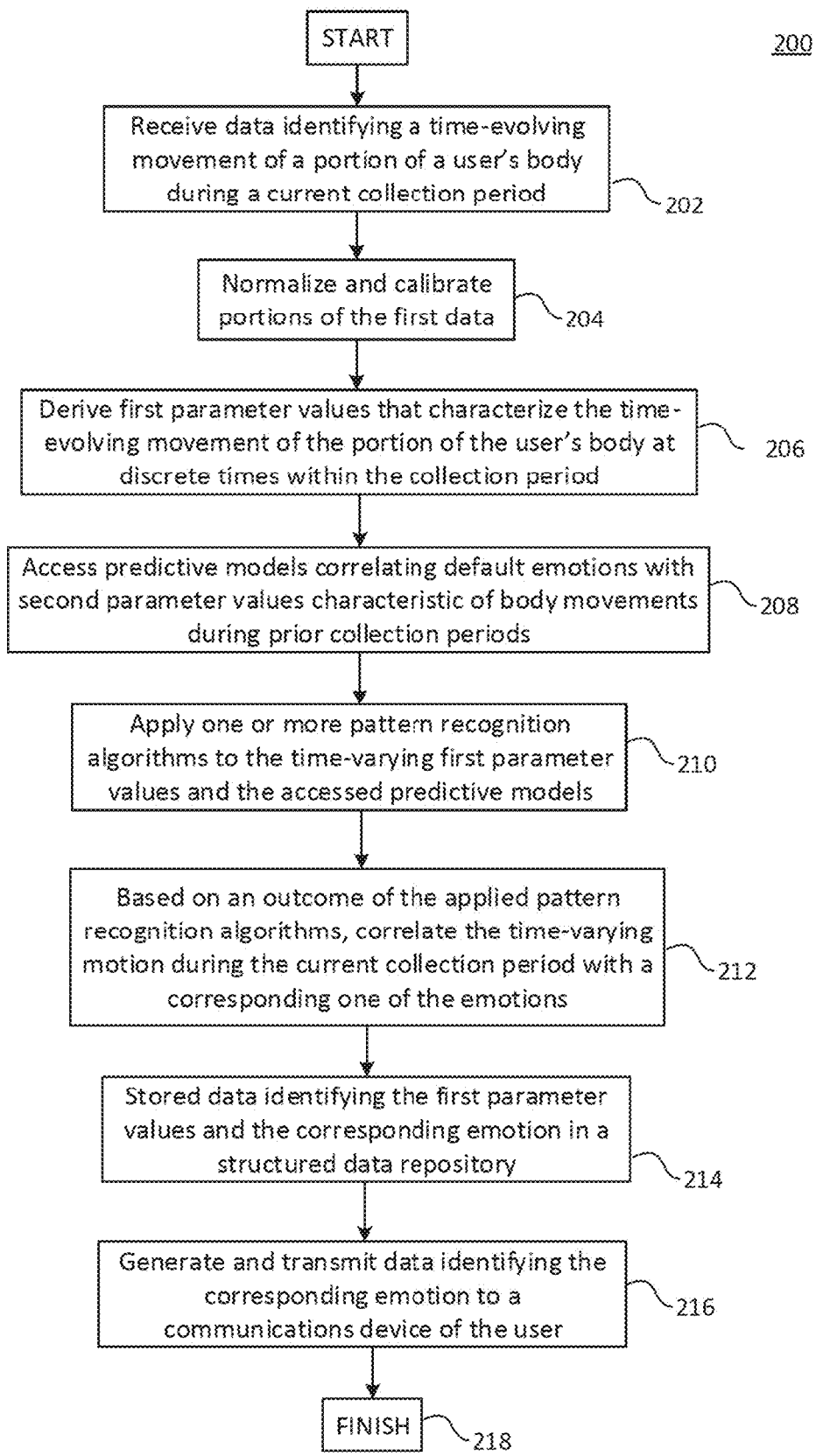
FIG. 2 is a flowchart of exemplary process for determining an emotion expressed by a time-evolving, free-form movement during a collection period.

FIG. 2 is a flowchart of an example process 200 for determining an emotion represented by a time-evolving, free-form movement of one or more portions of an individual's body. In certain aspects, emotion detection system 120 may perform the steps of example process 200. For example, emotion detection system 120 may receive data indicative of a time-evolving, free-form movement of a portion of a body of a user during a current collection period, may derive feature values that characterize the free-form movement at corresponding times within the current collection period, may access emotion-specific predictive models that correlate a time-evolving movement of one or more portions of a human body with previously expressed default emotions and their intensities during prior collection periods, and based on an application of one or more pattern-recognition algorithms, machine-learning algorithms, and/or data analytics to the derived feature values and to the emotion-specific predictive models, may identify a corresponding one of the default emotions represented by the user's free-form movement during the collection period. As described below, emotion detection system 120 may also generate and transmit data characterizing the corresponding emotion to a communications device of the user, such as client device 110, which may present a representation of the corresponding emotion to the user through an interface.

In some aspects, emotion detection system 120 may receive first data, such as movement data 104, indicative of a time-evolving, free-form movement of a portion of a body of the user during a current collection period (step 202). In one instance, and as described above, the free-form movement may correspond to the movement of the user's finger across a surface of a pressure-sensitive, touchscreen display of client device 110 during the current collection period, and the received first data may include, but is not limited to, two-dimensional positions of contact between the user's finger and touchscreen display surface at the discrete detection times during the collection period, and values of a pressure applied by the user's finger onto touchscreen display surface 112 at each of the contact positions and the discrete detection times. In other instances, described above, the free-form movement may correspond to a movement of the user's finger through the user's environment during the current collection period, and the received first data may include, but is not limited to, the three-dimensional positional data captured at each of the discrete detection times within the current collection period.

In additional aspects, the received first data may include device identifiers of the communications devices that captured portions of the received first data within the collection period, such as sensor device 102 and client device 110, and data identifying one or more characteristics of these communications devices, such as dimensions of corresponding touchscreen display units. Further, and as described above, the received first data may also include data identifying a mode of data collection (such as the active mode performed by client device 110 or sensor device 102, and the passive mode performed by sensor device 102 without user intervention) and a specified operation configuration (such as the open or focused mode specified by the user through the selection of interface elements within GUI 140A).

Emotion detection system 120 may perform operations that calibrate and normalize portions of the received first data (step 204). For example, and using any of the processes described above, emotion detection system 120 may calibrate the portions of received first data to reflect one or more characteristics of the user, such as a maximum pressure applied to touchscreen display surface 112 of client device 110 during a corresponding registration process. Further, in step 204, emotion detection system 120 may normalize the calibrated portions of the received first data in accordance with, among other things, characteristic dimensions of touchscreen display surface 112, maximum values of spatial positions, and/or maximum values of applied pressures, as described above.

In certain aspects, emotion detection system 120 may process the normalized and/or calibrated portions of the received first data to derive values of various features that characterize the time-evolving movement of the portion of the user's body during the current collection period (step 206). For example, as described above, the normalized and/or calibrated portions of the received first data may be indicative of the time-evolving, free-form movement of the user's finger across a portion of touchscreen display surface 112 of client device 110 during the current collection period. Using any of the processes described above, emotion detection system 120 may, in some instances, process portions of the received first data, as normalized and calibrated above, to derive values of various features that characterize the time-evolving movement of the user's finger during the current collection period.

For example, emotion detection system 120 may compute "micro-differences" in the two-dimensional contact position and applied pressure between successive pairs of discrete detection times, and based on the computed micro-differences, derive values of one or more features that characterize the time-evolving movement of the user's finger during the current collection period. For example, the one or more derived features values may include, but are not limited to: a speed of the user's finger at each of the discrete detection times; an acceleration of the user's finger at each of the discrete detection times; a displacement of the user's finger during successive pairs of the discrete detection times; a direction of the movement of the user's finger at each of the discrete detection times; a change in the calibrated pressure during successive pairs of the discrete detection times; an area of contact between the user's finger touchscreen display surface 112 at each of the discrete detection times; a shape of a movement of the user's finger along touchscreen display surface 112 during the collection period; and values of any additional or alternate feature, such as those described above.

Emotion detection system 120 may obtain predictive model data that establishes and specifies one or more emotion-specific predictive models that correlate time-evolving movements of one or more portions of a human body with default emotions and corresponding intensities expressed during prior collection periods (step 208). In some instances, each of the emotion-specific models may be associated with a corresponding one of the default emotions described above, such as anger, awe, desire, fear, grief, hate, laughter, and love, and as described above, emotional database 123 may store data that establishes and specifies each of the emotion-specific predictive models. For example, and as described above, the data stored within emotional database 123 may identify, for each of the emotion-specific predictive models, a corresponding default emotion, a combination of derived feature values that serve as inputs, the time-evolving patterns in the combination of derived feature values correlated to the corresponding default emotion, and the ranges of the derived feature values that are correlated to the intensities of the corresponding default emotion, such as the intensities of frustration, frustration, anger, rage, and fury associated with the expressed emotion of anger.

In some aspects, in step 208, emotion detection system 120 may access emotional database 123, and based on the derived feature values, identify one or more of the predictive models whose inputs are consistent with the derived feature values. For example, the derived feature values may include time-evolving values of two-dimensional finger speed, two-dimensional finger direction, and calibrated pressure changes, and emotion detection system 120 may identify predictive models for each of the default emotions that accept, as input data, the time-evolving values of the two-dimensional finger speed, two-dimensional finger direction, and calibrated pressure changes. Emotion detection system 120 may obtain, from emotional database 123, portions of the stored data that specify each of the identified predictive models using any of the processes described above.

In step 210, emotion detection system 120 may apply one or more pattern recognition algorithms to (i) portions of the derived feature values that characterize the free-form motion of the user's finger during the current collection period and (ii) portions of the predictive model data that specify the emotion-specific predictive models that correlate the time-evolving movement of various human body portions with default emotions and corresponding intensities expressed during prior collection periods. Further, and based on an outcome of the application of the one or more pattern recognition algorithms, emotion detection system 120 may determine a corresponding one of the default emotions and a corresponding one of the intensities that represent the free-form movement of the user's finger during the current collection period, and may generate data indicative of the determined default emotion and corresponding intensity (step 212).

For example, the one or more pattern recognition algorithms may include one or more data mining algorithms and data analytics. Using any of the processes described above, emotion detection system 120 may apply the one or more data mining algorithms and data analytics to the portions of the derived feature values in step 210, and based on the application of the data mining algorithms and data analytics, may identify time-evolving patterns in the derived feature values that characterize the free-form movement of the user's finger across touchscreen display surface 112 during the current collection period. Further, in step 210, emotion detection system 120 may also apply the each of the identified emotion-specific predictive models to the determined time-evolving patterns in the derived feature values. Based on the application of these predictive models, emotion detection system 120 may correlate in step 212 the time-evolving patterns in the derived feature values, such as the values of two-dimensional finger speed, two-dimensional finger direction, and calibrated pressure changes derived during the current collection period, with a corresponding one of the default emotions, and further, an intensity of the corresponding default emotion using any of the processes described above.

In additional aspects, the one or more pattern recognition algorithms may include one or more machine learning algorithms, such as a decision-tree learning algorithm, and emotion detection system 120 may apply the one or more machine learning algorithms to portions of the derived feature values and the predictive model data using any of the processes described above. For example, the derived feature values may include values of the two-dimensional finger speed, two-dimensional finger direction, and calibrated pressure changes during the current collection period, and portions of the predictive model data may establish, among other things, predictive models that correlate the default emotions and corresponding intensities to ranges of time-evolving values of the two-dimensional finger speed, two-dimensional finger direction, and calibrated pressure changes derived during prior collection periods. In certain instances, and based on an application of the one or more machine learning algorithms in step 210, machine learning module 126 may, in step 212, correlate the derived, time-evolving feature values associated with the current collection period with a corresponding one of the ranges of the time-evolving feature values, which may be associated with a particular default emotion and a corresponding intensity, such as the default emotion of anger and the corresponding intensity of frustration.

In some instances, the user's expressive, free-form movement may be modulated by a single emotion, such as anger, throughout the current collection period, and the application of the one or more pattern-recognition algorithms, machine-learning algorithms, and/or data analytics to the portions of the derived feature values and the predictive model data in step 212 may correlate the detected free-form movement that corresponds to the expressed anger. In other instances, however, the user's expressive, free-form movement may be modulated by more than one emotion, and the application of the one or more pattern-recognition algorithms, machine-learning algorithms, and/or data analytics in step 212 may establish a "mixed" emotional state in which two or more emotions overlap during the expressive, free-form movement.

By way of example, a first emotion may initially modulate the expressive, free-form movement, but may be interrupted by a second emotion that takes control of and/or interferes with the previous first emotion and modulates the rest of the individual's expressive, free-form movement. The resulting mixed emotion state, as established by emotion detection system 120 in step 212, may commonly exist in individuals experiencing emotion disorders or high levels of mental or physical stress, and additionally or alternatively, may characterize unstable or hyperactive individuals. In further instances, the user's expressive, free-form movement may be modulated by multiple "near-emotions," such as love and grief and anger and hate, which are closely related (such as love or have) or which may evolve (such as an evolution from anger to hate or vice versa).

In response to an identification of multiple emotions that modulate the individual's expressive free-form movement, emotion detection system 120 may select a corresponding one of the identified emotions in step 212 based on an assigned weighting scheme. The assigned weighting scheme may, in some aspects, establish weights for each of the default emotions of anger, awe, desire, fear, grief, hate, laughter, and love such that the weight assigned to a more unpleasant emotion, such as anger, exceeds the weight applied to a less unpleasant emotion, such as awe. For example, and based on the application of the one or more pattern-recognition algorithms, machine-learning algorithms, and/or data analytics, emotion detection system 120 may correlate the detected free-form movement with a expression of anger, which transitions during the free-form movement into an expression of grief. In some instances, the assigned weighting scheme may weigh the expression of anger more highly than the expression of grief, and emotion detection system 120 may output the correlated emotion assigned the largest weight, i.e., the expression of anger, as the corresponding emotion in step 212. The disclosed implementations are, however, not limited to these examples of weighting schemes, and in other implementations, emotion detection system 120 may apply any additional or alternate weighting scheme appropriate to the default emotions, the pattern-recognition algorithms, the machine-learning algorithms, the data analytics, derived feature values, and/or the predictive model data.

In other aspects, emotion detection system 120 may select a corresponding one of the identified emotions in step 212 based on an operational mode of emotion detection system 120, which, for example, may be established by the user's selection of one or more of emotional indicators 144A-144H within emotional interface 142 of FIG. 1B. For example, the user may provide, via client device 110, input to emotional interface 142 that selects a corresponding one of emotional indicators 144A-144H associated with a particular recognized emotion, such as anger. Client device 110 may transmit data indicative of the selected emotional indicator and corresponding recognized emotion to emotion detection system 120, and using any of the processes described above, emotion detection system 120 may establish a focused emotion-specific mode of operation that correlates the user's free-form movement with the recognized emotion, such as anger. In some aspects, if emotion detection system 120 were to determine that multiple expressed emotions modulate the user's detected free-form movement, emotion detection system 120 may select and output in step 212 a corresponding one of the expressed emotions that is consistent with the focused, emotion-specific operational mode of emotion detection system 120.

For example, and as described above, emotion detection system 120 may correlate the detected free-form movement with the user's expression of anger, which transitions during the free-form movement into an expression of grief. Further, in some instances, emotion detection system 120 may establish an anger-focused mode of operation in response to the user's prior selection of emotional indicator 144B, which corresponds to the user's recognition of anger. In certain aspects, in step 212, emotion detection system 120 may determine that the correlated expression of anger is consistent with the anger-focused operational mode, and may output the expression of anger as the corresponding emotion in step 212.

Emotion detection system 120 may, in certain aspects, perform operations that store data correlating the corresponding emotion and intensity with portions of the derived feature data in portion of emotional database 123 (step 214). For example, and as described above, emotion detection system 120 may determine that time-evolving values of finger speed, finger acceleration, and/or pressure variations that characterize the time-evolving movement of the user's finger during the current collection period correspond to an expression of joy, and in step 214, emotional detection system 120 may store data correlating the expression anger having an intensity of emotion with the derived features values (such as the time-evolving values of finger speed, finger acceleration, and/or pressure variations) within emotional database 123.

In further instances, in step 214, emotion detection system 120 may store data correlating the determined default emotions, corresponding intensities, and derived feature values in accordance with the established mode of data collection (such as the active mode performed by client device 110 or sensor device 102, and the passive mode performed by sensor device 102 without user intervention) and the specified operation configuration (such as the open or focused mode specified by the user through the selection of interface elements within GUI 140A). For example, if sensor device 102 were configured to capture portions of the received first data passively and without user intervention, or if client device 102 were configured to actively capture portions of the received first data in an open configuration mode, emotion detection system 120 may store the data correlating the corresponding emotion and intensity with portions of the derived feature data in the portion of emotional database 123 in step 214.

In certain aspects, if client device 110 were configured to actively capture portions of the received first data in the focused configuration mode, emotion detection system 120 may first determine whether the emotion recognized by the user corresponds to the default emotion determined by emotion detection system 120 using any of the processes described above. If emotion detection system 120 were to determine that the determined default emotion corresponds to the recognized emotion, then emotion detection system 120 may store the data correlating the corresponding emotion and intensity with portions of the derived feature data in the portion of emotional database 123, as described above in reference to step 214. If emotion detection system 120 were to determine that the determined and recognized emotions conflict, then emotion detection system 120 may ignore the user's request to associate the user-recognized emotion with the user's free-form movement, and as described above, may decline to store data in emotional database 123 that associates the user-recognized emotion with the derived feature data indicative of the user's free-form movement during the current collection period.

Referring back to FIG. 2, emotion detection 120 system may generate and transmit data identifying the determined emotion and corresponding intensity to a communications device associated with the user, such as client device 110 (step 216). For example, and as described above, emotion detection system 120 may generate interface data describing the emotion and the corresponding intensity represented by the free-form movement of the user's finger during the current collection period, and further, layout data specifying values of one or more interface characteristics, such as a text position, a text color, or a background color. Emotion detection system 120 may transmit portions of the generated interface and layout data to client device 110, and client device 110 may process portions of the generated interface data for presentation to the user within a corresponding interface, such as a graphical user interface (GUI) or voice-user interface (VUI) using any of the processes described above.

In further aspects, and as described above, emotion detection system 120 may access an emotion dictionary stored within emotion database 123, and may obtain data records associated with the determined default emotion. These obtained data records may, for example, include default intensities associated with each intensity level of the determined emotion, and synonyms for the determined emotion and each of the default intensities. In some aspects, emotion detection system 120 may populate the generated interface data with the obtained the terms that represent the determined emotion, the corresponding intensity, and synonyms of the determined emotion and corresponding intensity, which emotion detection system 120 may transmit to client device 110 for presentation to the user through a corresponding interface using any of the processes described above.

Referring back to FIG. 2, and as described above, emotion detection 120 system may generate and transmit interface and layout data identifying the determined default emotion and corresponding intensity, and further, additional or alternate linguistic elements that described the determined emotion and corresponding intensities in various languages, cultures, and/or geographic regions, to client device 110 for presentation to the user through the corresponding interface. Upon transmission of the generated interface and layout data to client device 110, process 200 may be complete in step 218.

Figure 3:
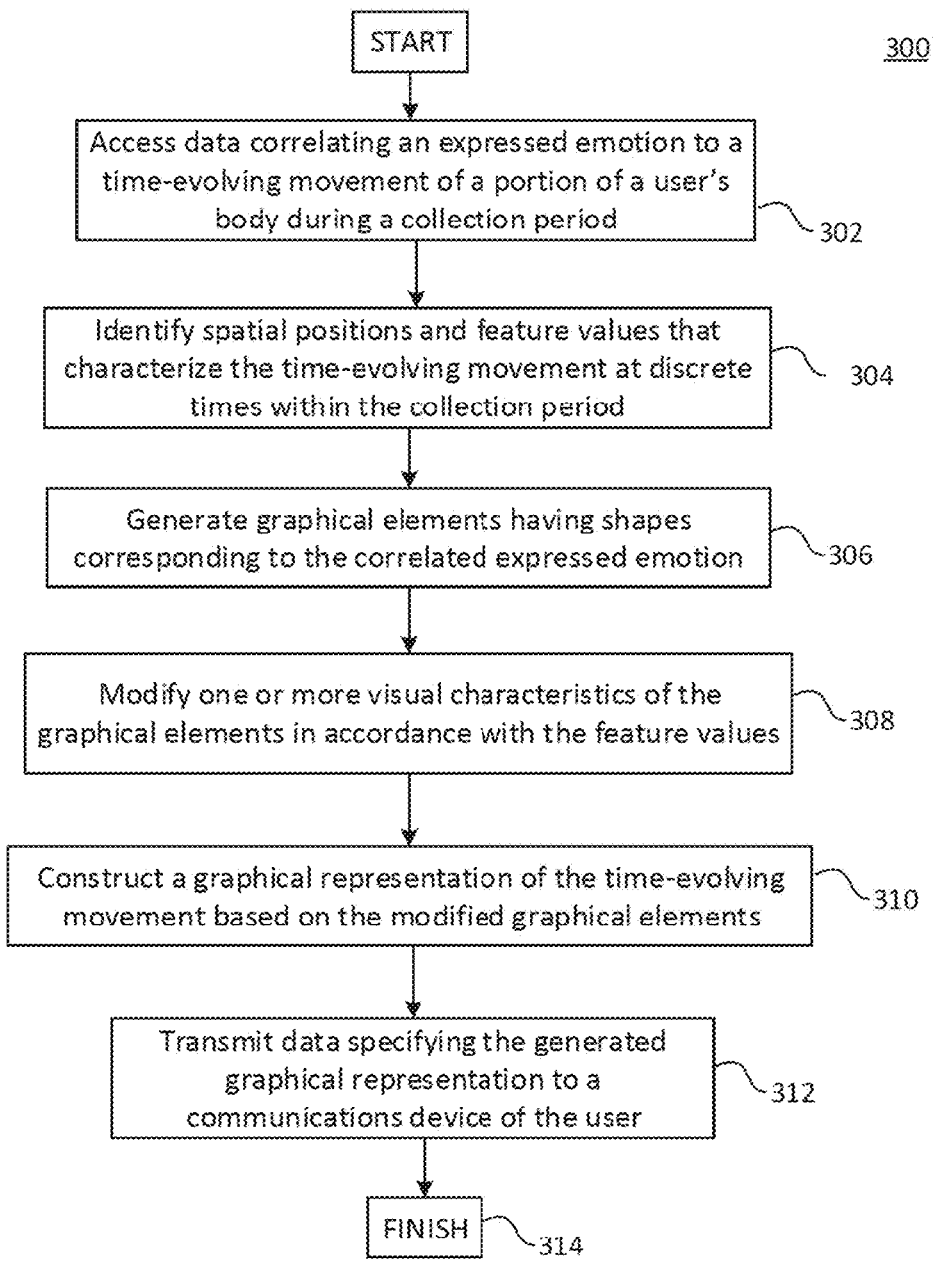
FIG. 3 is a flowchart of an exemplary process for generating a graphical representation of an expressed emotion during a collection period.

FIG. 3 is a flowchart of an example process 300 for generating a graphical representation of an emotion and corresponding intensity represented by a time-evolving, free-form movement of a portion of a user's body during a current collection period. In certain aspects, emotion detection system 120 may perform the steps of example process 300. For example, emotion detection system 120 may access data correlating an expressed emotion to a time-evolving, free-form movement of a portion of a body of user during a current collection period, determine spatial positions and feature values that characterize the free-form movement at discrete times within the current collection period, generate graphical elements having visual characteristics corresponding to the expressed emotion and corresponding intensity, the determined spatial positions, and the determined feature values, and generate a graphical representation of the expressed emotion and corresponding intensity that includes the generated graphical elements, for example, as graphical representation 143 within emotional interface 142 of FIGS. 1E-1G.

In some aspects, emotion detection system 120 may obtain data that correlates an expressed emotion and corresponding intensity to a time-evolving, free-form movement of a portion of the user's body, such as the user's finger, during a current collection period (step 302). Based on the obtained data, emotion detection system 120 may determine spatial positions and feature values that characterize the time-evolving, free-form movement of the user's finger at discrete detection times within the current collection period (step 304). For example, and as described above, emotion detection system 120 may obtained stored data correlating a determined expression of anger having an intensity of frustration to multidimensional data indicative a time-evolving, free-form movement of the user's finger along touchscreen display surface 112 of client device 110 during the current collection period. The obtained data may, include, but is not limited to a normalized two-dimensional contact position and a calibrated applied pressure associated at the discrete detection times within the collection period, and further, derived values of various features associated with each of the contact positions and discrete detection times (such as a finger speed, a finger direction, and a change in applied pressure associated with each pair of contact positions and discrete detection times).

In step 306, emotion detection system 120 may generate graphical elements having shapes that correspond to the expressed emotion and corresponding intensity. Emotion detection system 120 may, in certain instances, obtain data within emotion database 123 that assigns default shapes to combinations of the default emotions and corresponding intensities described above, and that associates characteristics of these default shapes with corresponding ones of the derived feature values, such as the values of finger speed, directions of movement, and changes in applied pressure, at the corresponding detection times within the current collection period. For example, emotion detection system 120 may assign red-colored graphical elements shaped as triangles to the default emotion of anger and the default intensity of frustration. Further, the stored graphical-element data may correlate variations in the assigned red color a particular color with particular variations in the derived feature values.

Further, in step 306, emotion detection system 120 may process portions of the obtained correlation data to identify two-dimensional contact positions (such as those disposed within emotional interface 142, as described above) at the discrete detection times, and further, to associate subsets of the derived feature values with corresponding ones of the identified two-dimensional contact positions and discrete detection times. For example, emotion detection system 120 may identify a value of a finger speed, a finger direction, and a change in applied pressure associated with each pair of contact positions and detection times, and in step 306, may generate a graphical element, such as a red, triangle-shaped graphical element, for each pair of contact positions and detection times.

In step 308, emotion detection system 120 may modify one or more visual characteristics of the generated graphic elements in accordance with the derived feature values that characterize the time-evolving motion of the user's finger during the current collection period. For example, emotion detection system 120 may linearly vary a brightness of the red color of the generated graphical elements in accordance with a magnitude of the derived finger speed and derived change in applied pressure at the corresponding contact positions and discrete detection times. The disclosed implementations are not limited to these examples of graphical elements, visual characteristics and modifications, and in other implementations, emotion detection system 120 may assign any additional or alternate graphical element to the determined anger and the determined intensity of frustration, to the other intensity levels associated with anger, or to any other combination of default emotions and corresponding default intensities. Further, emotion detection system 120 may also modify any additional or alternate visual characteristic of the generated graphical elements, such as shape, to reflect any of the derived feature values described above.

Emotion detection system 120 may, in some aspects, construct a graphical representation of the emotion and corresponding intensity expressed by the during the current collection period, and thus, the time-evolving, free-form movement of the user's finger during that collection period, based on the modified graphical elements (step 310). For example, in step 310, emotion detection system 120 generate graphical element data that specifies a shape, such as a triangle, colors, such as varying shades of red, and default dimensions that characterize the generated graphical elements. Emotion detection system 120 may also generate layout data assigning each of the generated graphical elements, having visual characteristics modified above, to corresponding ones of the contact positions (such as those disposed within emotional interface 142), and may generate orientation data that orients a vertex point of each triangle-shaped graphical elements in the direction of finger movement at the corresponding contact position within emotional interface 142.

Emotion detection system 120 may transmit portions of the graphical element data, layout data, and orientation data, which specify the constructed graphical representation, to client device 110 (step 312). For example, client device 110 process the received graphical element data, layout data, and orientation data and present the constructed graphical representation within a corresponding interface, such as graphical representation 143 within emotional interface 142 of GUI 140B, as illustrated in FIG. 1E. Process 300 may then be complete in step 314.

In certain implementations, as described above, emotion detection system 120 may construct a graphical representation of an emotion and corresponding intensity expressed by the user during a current collection period, and thus, of a time-evolving, free-form movement of a portion of the user's body during that collection period, based on generated graphical elements having visual characteristics that reflect the expressed emotion and the corresponding intensity. In other implementations, described below in reference to FIG. 4A, emotion detection system 120 may modify one or more visual characteristics of a user-specified digital image to reflect the expressed emotion and the free-form motion of the portion of the user's body during the collection period.

Figure 4A:
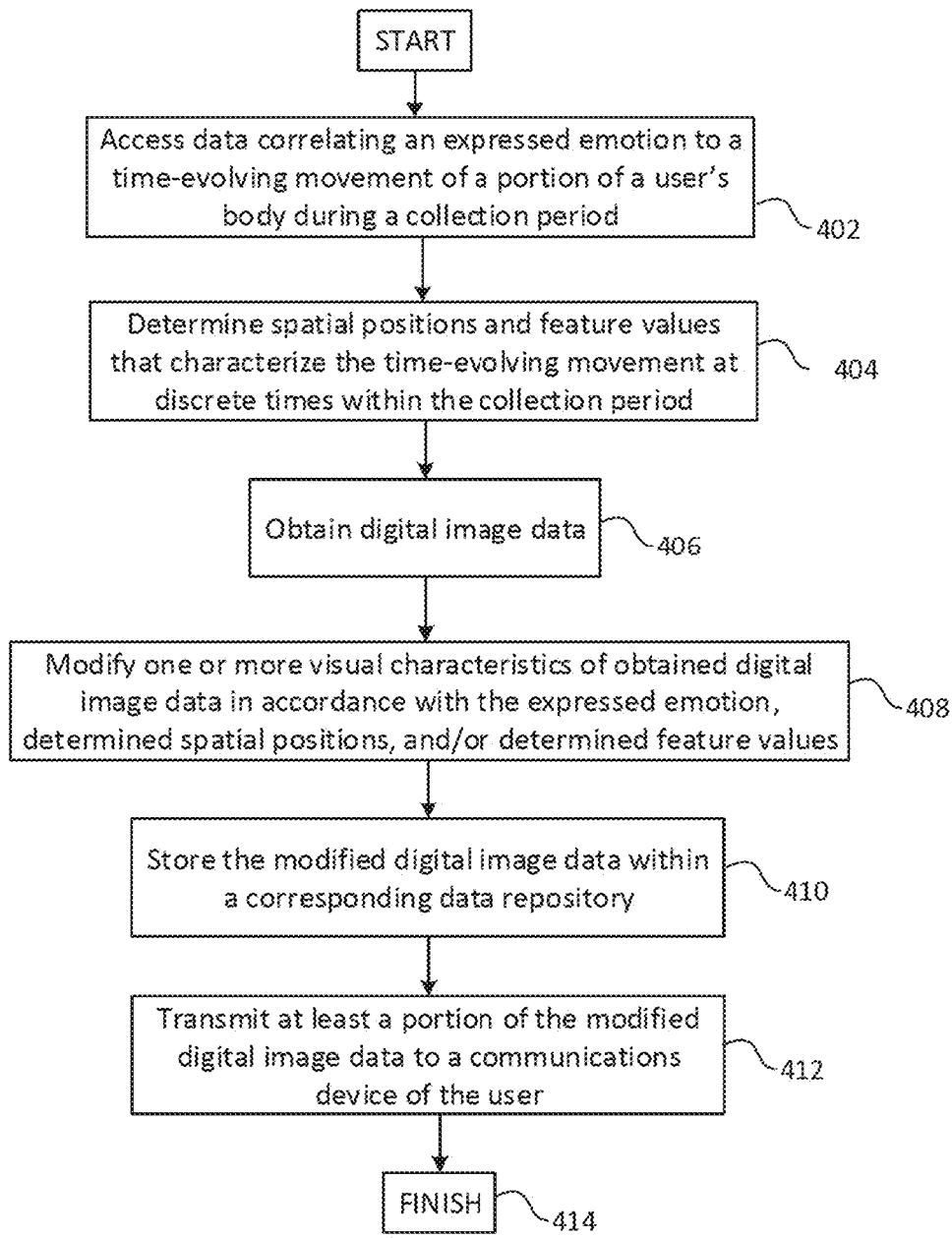
FIG. 4A is a flowchart of an exemplary process for modifying digital image data in accordance with an emotion expressed by a time-evolving, free-form movement during a collection period.

FIG. 4A is a flowchart of an example process 400 for modifying obtained digital image data in accordance with an emotion and a corresponding intensity represented by a time-evolving, free-form movement of a portion of a user's body during a corresponding collection period. In certain aspects, emotion detection system 120 may perform the steps of example process 400. For example, emotion detection system 120 may access data correlating an expressed emotion to a time-evolving movement of a portion of a body of a user during a collection period, determine spatial positions and feature values that characterize the identified time-evolving movement discrete times within the collection period, obtain digital image data associated with an occurrence of an event during the collection period, and modify one or more visual characteristics of obtained digital image data in accordance with the correlated emotion, determined spatial positions, and/or feature values.

In some aspects, emotion detection system 120 may obtain data that correlates an expressed emotion and corresponding intensity to a time-evolving movement of a portion of the user's body, such as the user's finger, during a current collection period (step 402). Based on the obtained data, emotion detection system 120 identify spatial positions and feature values that characterize the time-evolving, free-form movement of the user's finger at the discrete detection times within the current collection period (step 404). For example, and as described above, emotion detection system 120 may obtain stored data correlating a determined expression of anger having a corresponding intensity of frustration to multidimensional data indicative a time-evolving, free-form movement of the user's finger along touchscreen display surface 112 of client device 110 during the current collection period. The obtained data may, for example, include, but is not limited to a normalized two-dimensional contact position and a calibrated applied pressure associated at the discrete detection times within the current collection period, and further, derived values of various features associated with each of the contact positions and discrete detection times (such as a finger speed, a finger direction, and a change in applied pressure associated with each pair of contact positions and discrete detection times).

In some aspects, emotion detection system 120 may also obtain digital image data (step 406). For example, the user may attend an event, such as a concert, sporting event, or party, during the collection period, and the obtained digital image data may corresponding to an image associated with the event, which may be captured by client device 110 and transmitted to emotion detection system 120. In other instances, client device 110 may store, within an accessible local or cloud-based data repository, data corresponding to one or more digital images previously captured by client device 110, and client device 110 may transmit portions of the stored digital image data to emotion detection system 120. For example, client device 110 may transmit the portions of the stored digital image data to emotion detection system 120 in response to input provided by the user or a request received from an application executed by emotion detection system 120 or an external computing system through a corresponding programmatic interface. The disclosed implementations are not limited to these examples of obtained digital image data, and in further implementations, emotion detection system 120 may obtain data corresponding to digital images captured by one or more additional users during the collection period, such as users that attended the event, stock images associated with the event or performers at the event, and historical or past events of interest to the user.

Emotion detection system 120 may, in some aspects, modify one or more visual characteristics of obtained digital image data in accordance with the expressed emotion, determined spatial positions, and/or the derived feature values (step 408). For example, emotion detection system 120 may establish a statistical measure of at least one of the feature values, such as an average speed at which the user's finger moved along the surface during the collection period, and may normalize the values of the derived finger speed based on the average speed. In some aspects, in step 408, emotion detection system 120 may determine pixel values that characterize pixels disposed within one or more portions of the digital image data, and may modify the obtained digital image data by mapping increases or decreases in the normalized values of the of the average finger speed at each contact times and positions to proportional increases or decreases in the determined pixel values. In other aspects, emotion detection system 120 may blur or obscure portions of the obtained digital image data, introduce noise into the obtained digital image data, modify a luminance or color of certain objects disposed within the obtained digital image data (for example, based on an application of one or more object or feature recognition algorithms to the obtained digital image data), or modify any additional or alternate visual characteristic of the obtained digital image data to reflect the user's expressed emotion or the time-evolving, free-from movement of the user's finger during the current collection period.

Figure 4B:
FIGS. 4B and 4C are diagrams illustrating exemplary modifications to digital image data and modified digital image data.
Figure 4C:

For example, FIG. 4B illustrates a digital image 440 captured by an organizer of an event (or a tract creator, as described above) during the user's attendance at the event during a corresponding collection period. In some examples, as described above, emotion detection system 120 may perform operation that correlate the time-evolving, free-form motion of the user's finger across a surface of touchscreen display unit during the collection period with an expression of laughter during the user's attendance of the event. Based on portions of the derived feature values, such as the values of finger speed, finger acceleration, and/or applied pressure, emotion detection system 120 may modify portions of the obtained digital image data corresponding to digital image 440, to reflect the user's expression of joy and the time-evolving, free-form motion of the user's finger during the collection period. For example, as illustrated in FIG. 4C, emotion detection system 120 may generate a modified digital image 450, and corresponding modified digital image data, by blurring portions of the obtained digital image data and modifying the luminance or color of certain objects within the obtained digital image data to reflect the user's expression of joy and thus, the time-evolving, free-form motion of the user's finger during the collection period. In some aspects, emotion detection system 120 may modify digital image 440 based on data indicative of the free-form movement recorded by each participant in the created tract, as described above, and modified image 450 may belong to the tract creator, such as the event organizer.

In some aspects, emotion detection system 120 may store portions of the modified digital image data within emotional database 123 of other accessible data repository (step 410), and may generate and transmit portions of the modified digital image data to a communications device associated with or operated by the user, such as client device 110 (step 412). For example, upon receipt of the portions of the modified digital image data, client device 110 may present the modified digital image to the user within a portion of a corresponding interface, such as GUI 140B. In other aspects, emotion detection system 120 may transmit portions of the modified digital image data to one or more additional users linked to the user through a corresponding biomedia network, as described above. Further, in some aspects, emotion detection system 120 may perform operations that establish an online store or digital marketplace (for example, by providing corresponding data to client device 110 and other devices for presentation through a web page or other digital portal), and may offer portions of modified digital image 450, for sale to the user and other attendees of the event. In certain instances, process 400 may then be complete in step 414.

In certain implementations, and as described above, the user may express an emotion through a time-evolving, free-form movement of a finger across a surface of a touchscreen display unit of a communications device (for example, across surface portion 112A of client device 110 of FIG. 1C) and additionally or alternatively, through a time-evolving movement of the user's finger through an environment (for example, as detected by wearable sensor device 102 of FIG. 1E). These example implementations are, however, not limited to a free-form movement of the user's finger, and in additional implementations, the user may express an emotion through a time-evolving movement of any additional body part, or through any combination of body parts, having sufficient freedom of motion to enable client device 110, sensor device 102, or any additional or alternate interaction platform to capture data indicative of the time-evolving movement.

In certain implementations, described above, the user may deliberately input a time-evolving, free-form movement of the user's finger into a corresponding portion of a graphical user interface presented to the user through a corresponding interface, such as emotional interface 142 within GUI 140A. In some instances, client device 110 may present information within GUI 140A that prompts the user to provide the free-form input using any of the processes described above. For example, the user may access and view portions of electronic content during a current collection period (e.g., streaming digital video content provided by Netflix™ or Hulu™), and client device 110 may prompt the user to provide, to emotional interface 142 of GUI 140A, free-form movement representing an emotion indicative of the user's reaction to the viewed digital streaming content. Additionally or alternatively, the user may attend an event, such as a concert, sporting event, or political rally, during the collection period, and client device 110 may prompt the user to provide, to emotional interface 142 of GUI 140A, free-form movement representing an emotion indicative of the user's reaction to the event using any of the processes described above. For example, client device 110 (or alternatively, sensor device 102) may capture and transmit data indicative of the time-evolving, free-form movement of the user's finger or other body part during the collection period to emotion detection system 120. Using any of the processes described above, emotion detection system 120 may determine an emotion and corresponding intensity represented by the free-form movement and transmit data indicative of the expressed emotion, the free-form movement, and/or the viewed content or event that elicited the expressed emotion to client device 110 for presentation to the user through a corresponding interface, such as GUI 140B or a VUI.

In additional aspects, emotion detection system 120 may also provide a portion of the data indicative of the expressed emotion and corresponding intensity, the free-form movement, and additionally or alternatively, the viewed content or event to one or more additional users or entities linked to the user through a corresponding biomedia network, as described above. For example, a provider of the electronic content or an organizer of the event may be linked to the user within the biomedia network (for example, based on the user's "liking" of the electronic content or the event), and emotion detection system 120 may provide data indicative of the expressed emotion and corresponding intensity, and the electronic content or event that elicited the expressed emotion, to the provider or organizer through the corresponding biomedia network using any of the processes described above.

In other aspects, an external computing system maintained by the provider of the electronic content or the organizer of the event may establish communications with emotion detection system 120 and may, though a corresponding programmatic interface (such as an application programming interface (API)), request data indicative of the emotions expressed by the user and other users viewing the electronic content or attending the event during the current collection period. Emotion detection system 120 may, in some instances, transmit data indicative of the emotions and corresponding intensities expressed by the user and/or the other users during the current collection period to the external computing system through the API. In other instances, an in response to the request or a prior registration process, emotion detection system 120 may transmit or "push" data indicative of the emotions expressed by the user and additionally or alternatively, the other users, at predetermined intervals. In certain instances, the external computing system may determine, for the provider of the electronic content or the organizer of the event, a real-time rating of the electronic content or the attended event based on the emotions expressed by viewers or attendees. Based on the determined, real-time rating, the external computing system may selectively identify and present to the user additional electronic content, and additionally or alternatively, may provide recommendations of other scheduled events, that better comport with the user's interests.

Further, as described above, client device 110 may represent a communications device, such as a smart phone or tablet computer, having a touchscreen display, and client device 110 may prompt the user to provide input reflecting the user's current emotional state within a portion of a graphical user interface, such as emotional interface 142 of GUI 140A, presented by a touchscreen display of client device 110. In other implementations, the communications device may also include a connected, Internet-of-Things (IoT) device, such a smart appliance, a smart light fixture, or a smart thermostat, in communication with emotion detection system 120 across any of the networks described above.

By way of example, the connected IoT device may include a touchscreen display, and may execute one or more application programs, e.g., application programs associated with emotion detection system 120, which may cause the connected IoT device to present a graphical user interface prompting the user to provide a time-evolving, free-form input reflective of the user's sentiments regarding the operation of the connected IoT device. In some instances, the time-evolving, free-form input may include a time-evolving, free-form movement of the user's finger along a portion of a surface of the touchscreen display, and the connected IoT device may capture and transmit data indicative of the time-evolving, free-form movement to emotion detection system 120. Emotion detection system 120 may determine an expressed emotion, and additionally or alternatively, a corresponding intensity, represented by the time-evolving, free-form movement, and provide data indicative of the expressed emotion to the user, and additionally or alternatively, to the manufacturer or retailer of the connected IoT device, using any of the processes described above.

In some instances, an emotion expressed by the user during a current collection period may be influenced by the user's physiological state during that collection period. For example, as described above in reference to FIG. 1A, sensor device 102 may also include one or more biometric sensors configured to passively monitor and capture biometric data indicative of a physiological state of the user during various collection periods, and further, additional components that store the captured biometric data and transmit portions of captured biometric data to emotion detection system 120 at throughout various collection periods. By way of example, sensor device 102 may detect, capture, and store biometric data identifying, among other things, a heart rate, respiration rate, a blood pressure, and body temperature of the user at various times during the current and prior collection periods, and sensor device 102 may transmit portions of the stored data as biometric data 106 to emotion detection system 120 during or upon completion of the collection period using any of the processes described above.

In additional implementations, emotion detection system 120 may perform operations that predict an emotional state of the user during a current collection period based on an application of one or more pattern recognition algorithms and machine learning algorithms to biometric data characterizing the user's physiological state during the current collection period and emotional data correlating time-evolving patterns in one or more of biometric characteristics of the user during prior collection periods with emotions expressed during these prior collection periods. For instance, and referring back to FIG. 1A, machine learning module 126 may apply the one or more machine learning algorithms to time-evolving biometric data captured by various sensor devices, such as sensor device 102, during one or more prior collection periods, and emotional data characterizing an expressed emotion and a corresponding intensity during these prior collection periods. Based on an outcome of the application of the one or more machine learning techniques, emotion detection system 120 may identify time-evolving patterns in the biometric characteristics of the user that indicate not only an expression of an emotion and a corresponding intensity during the prior collection periods, but a physiological state of the user prior to, during, and after the expression of the emotion and the corresponding intensity. By way of example, emotion detection system 120 may determine a particular pattern in the user's heart rate and body temperature that indicate an expression of anger, and further, a particular pattern in the user's heart rate and body temperature that indicate the physiological "ramp-up" prior to the expressed emotion and the physiological "ramp-down" subsequent to the expressed emotion.

Further, in certain instances, machine learning module 126 may apply the one or more machine learning algorithms to the biometric data characterizing the user's physiological state during the current collection period and to the identified patterns that characterize the user's physiological state prior to, during, and after the expression of various emotions, such as anger. Based on the outcome of the application of the machine learning algorithms, machine learning module 126 may identify an expression of emotion that corresponds to, or alternatively, may result from, the user's current physiological state, and emotion detection system 120 may provide data indicative of the identified expression of emotion to client device 110 and/or to devices operated by other users using any of the processes described above. Through these implementations, emotion detection system 120 may provide, to the user, data identifying not only an emotion that the user is currently expressing, but also an emotion that the user's current physiological state indicates will be expressed in the future, thereby providing an opportunity to the user to control and or mediate the future expression of the emotion.

Further, in certain implementations described above, emotion detection system 120 receives, from client device 110, data indicative of a time-evolving, free-form movement of a portion of the user's body during a current collection period, may process the received data to determine an emotion and corresponding intensity represented by the time-evolving, free-form movement during the current collection period, and transmit data indicative of the determined emotion and corresponding intensity for presentation to the user through a corresponding interface. In other implementations, however, client device 110 may perform, with or without intervention from emotion detection system 120, any of the processes described above that determine the emotion and corresponding intensity represented by the time-evolving, free-form movement during the collection period.

For example, and using any of the processes described above, client device 110 may implement a corresponding normalization and calibration module that normalizes and calibrates captured data indicative of the time-evolving, free-form movement of the portion of the user's body during a current collection period, and a corresponding feature extraction module that derives feature values characterizing the time-evolving, free-form movement during the collection period. Similarly, in some instances, client device 110 may also implement a corresponding pattern recognition module and/or a corresponding machine learning module that apply one or more pattern recognition algorithms, one or more machine learning algorithms, and/or one or more data analytics described above to portions of the derived feature values, and based on an outcome of the application of these pattern recognition algorithms, machine learning algorithms, and/or data analytics, generate output data indicative of an expressed emotion and corresponding intensity represented by the time-evolving, free-form movement captured during the collection period. Additionally, in certain instances, client device 110 may implement a corresponding visualization module that renders portions of the output data for presentation to the user through a corresponding interface, as described above.

In some instances, client device 110 may be configured to locally store portions of movement data 104 described above, biometric data 106 described above, and data correlating the collected movement or biometric data to emotions expressed by the user during the current collection period or during one or more prior collection periods. In other instances, client device 110 may also store portions of this data within a remote data repository accessible across any of the networks described above, e.g., a cloud-based data repository, or within structure databases maintained by emotion detection system 120, e.g., emotional database 123 and/or biometric database 125.

In certain implementations, as described above, emotion detection system 120 may generate a graphical representation of an expressed emotion and corresponding intensity expressed by the user during a current collection period, and thus, of a time-evolving, free-form movement of a portion of the user's body during that collection period, based on generated graphical elements having visual characteristics that reflect the expressed emotion and the corresponding intensity. For example, emotion detection system 120 may obtain digital image data corresponding to digital images captured or stored locally by client device 110, and using any of the processes described above, may modify one or more visual characteristics of obtained digital image data in accordance with the emotion expressed by the user during the current collection period.

In other aspects, emotion detection system 120 may obtain digital image data representative of one or more randomly selected digital images, and modify one or more visual characteristics of the obtained image data to generate abstract art that reflects one or more emotions expressed by the user during the current collection period. For example, emotion detection system 120 may provide one or more user-specified keywords as input to a programmatic interface maintained by a search engine (e.g., a Google™ API), which may provide to emotion detection system 120 one or more digital images that are consistent with the user-specified keywords. In further instances, emotion detection system 120 may access digital image data stored locally by client device 110 or within an accessible, cloud-based data repository (for example, within a directory or location identified within user-specified preference data stored by emotion detection system 120), and may identify and retrieve one or more digital images consistent with the user-specified keywords and/or user-specified preferences.

Using any of the processes described above, emotion detection system 120 may modify one or more visual characteristics of the obtained digital images to reflect an expressive, free-form motion of a portion of the user's body during the current collection period (for example, based on portions of time-varying feature data 130A), and additionally or alternatively, the user's physiological state during that collection period (for example, based on portions of biometric data 130E). In some aspects, emotion detection system 120 may generate abstract art based on the modified digital image data, which may be provided to the user and/or additional users through a digital portal or web page associated with emotion detection system 120.

Further, in certain implementations, a computing artist may upload a new graphical design to emotion detection system 120, which may store data specifying the new graphical design within a corresponding data repository (such as a locally accessible data repository or an accessible cloud-based data repository). In some aspects, and using any of the processes described above, emotion detection system 120 may modify one or more visual characteristics of the graphical design data to reflect an emotion expressed by the user during the current collection period. In other aspects, the user may access the web page or digital portion of emotion detection system 120 using client device 110, and may provide input that initiates a download of the graphical design data to client device 110, which may assign the downloaded graphical design data to an expressed emotion using any of the processes described above. For example, the downloaded graphical design data may corresponding to a "theme" visualizing one or more emotions expressed by the user, and emotion detection system 120 may perform operations that provide a financial reward to computing artists that upload themes through the web page or digital portal, and additionally or alternatively, that receive payment from the user for downloaded theses (for example, through PayPal™ or through other digital payment services and processes compatible with the web page or digital portal).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including normalization and calibration module 121, feature extraction module 122, pattern recognition module 124, machine learning module 126, and visualization module 128, can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, such as an FPGA (field programmable gate array) or an ASIC (application-specific integrated circuit). The apparatus can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:
1. A system, comprising:
one or more computers; and
one or more storage devices storing instructions that are operable, when executed by the one or more computers, to cause the one or more computers to perform operations comprising:
  at a first time, presenting, on a touchscreen display unit of a communications device, a user interface of a plurality of predictive models configured to determine emotions that are experienced by users, the user interface including representations of a plurality of default emotions;
  receiving, through the user interface, (i) one or more first contacts on the touchscreen display unit, and (ii) data correlating the one or more first contacts with the plurality of default emotions;
  training the plurality of predictive models using the one or more first contacts and the data, to identify one or more default emotions of the plurality of default emotions upon being provided with data corresponding to contacts made with the touchscreen display unit;
  at a second time, receiving first data indicative of a first time-evolving movement of a portion of a body of the user of the communications device during a collection period, wherein the first time-evolving movement comprises a plurality of contacts established sequentially between the portion of the body of the user and a surface of the touchscreen display unit at corresponding first contact times during the collection period;
  determining, using the first data, first values of features that characterize the contacts during the collection period, wherein the features comprise an X coordinate of the portion of the body, a Y coordinate of the portion of the body, an area of contact of the portion of the body, a contact force of the portion of the body, and a time of movement of the portion of the body;
  accessing second data about the plurality of predictive models that have been trained at the first time, wherein one or more of the plurality of predictive models correlates ranges of second values of one or more of the features obtained during prior collection periods to default emotions of the plurality of default emotions;

comparing, using at least one of a pattern recognition algorithm or a machine learning algorithm, the first values of the features determined using the first data to the second data;

in response to the comparing, determining that one or more first values of the features are within ranges of second values of one or more features that correlate with a particular default emotion of the plurality of default emotions;

in response to the determination, associating the one or more first values with a predictive model that corresponds to the particular default emotion;

based on the associating, determining that the first time-evolving movement of the portion of the body of the user during the collection period indicates that the particular default emotion is experienced by the user during the collection period; and transmitting data indicative of the particular default emotion to the communications device to present a representation of the particular default emotion.

2. The system of claim 1, wherein:

a predictive model of the plurality of predictive models is associated with one or more intensities of a corresponding default emotion; and the one or more computers further perform the operations of:

based on the associating, identifying a particular intensity of the particular default emotion as being represented by the first time-evolving movement of the portion of the body during the collection period; and transmitting data indicative of the particular intensity to the communications device.

3. The system of claim 1, wherein:

the plurality of predictive models further correlate subsets of the ranges of the second values that characterize each of the default emotions with corresponding ones of plurality of default intensities; and the associating comprises establishing that the first values are consistent with a corresponding one of the subsets of the ranges, the corresponding one of the subsets of the ranges being associated with a corresponding one of the intensities.

4. The system of claim 1, wherein:

the communications device is further configured to capture and transmit portions of the first data to the system without intervention from the user; and the communications device is further configured to present the representation of the corresponding one of the default emotions.

5. The system of claim 1, wherein:

the one or more computers further perform the operations of identifying linguistic elements that express the particular default emotion within at least one of an additional language or an additional culture, and wherein the transmitting further comprises transmitting additional data comprising the identified linguistic elements to the communications device to present a representation of the identified linguistic elements to a user.

6. The system of claim 1, wherein the one or more computers further perform the operations of:

accessing calibration data associated with a user of the communications device;

modifying at least one of the X coordinate of the portion of the body, the Y coordinate of the portion of the body, the area of contact of the portion of the body, or the contact force of the portion of the body in accordance with the accessed calibration data; and normalizing at least one of the modified X coordinate of the portion of the body, modified Y coordinate of the portion of the body, modified area of contact of the portion of the body, or modified contact force of the portion of the body in accordance with a predetermined normalization scheme.

7. The system of claim 1, further comprising a database storing predicative models having corresponding default emotions, wherein the one or more computers further perform the operations of:

accessing, from the database, stored data identifying the plurality of predictive models having corresponding ones of the default emotions, the plurality of predictive models being associated with corresponding data inputs;

determining that at least a portion of the received first data is consistent with the data inputs of a subset of the plurality of predictive models; and obtaining, as the second data, portions of the stored data identifying the subset of the plurality of predictive models.

8. The system of claim 1, wherein the one or more computers further perform the operations of:

generating a plurality of graphical elements reflecting the contacts at the corresponding first contact times during the collection period, the graphical elements having corresponding visual characteristics established in accordance with the corresponding one of the expressed emotions;

establishing a graphical representation that includes the generated graphical elements; and transmitting data identifying the graphical representation to the communications device to present the graphical representation to a user.

9. The system of claim 1, wherein the one or more computers further perform the operations of:

obtaining digital image data;

modifying a visual characteristic of at least a portion of the digital image data to reflect at least one of the first time-evolving movement of the portion of the body during the collection period or the corresponding one of the expressed emotions; and transmitting the modified digital image data to the communications device.

10. The system of claim 1, wherein determining, using the first data, the first values comprises identifying at least one of (i) time-evolving spatial positions of or (ii) time-evolving forces applied to the portion of the body at corresponding times within the collection period, wherein:

the communication devices comprises one or more sensor devices that are configured to detect the at least one of the time-evolving spatial positions or the time-evolving forces at the corresponding times during the collections period; and the one or more sensor devices comprise at least one of a wearable device, a devices embedded within the communications device, or a device embedded within an object.

11. The system of claim 1, wherein:

the user is a member of a biomedia network;

the communications device is configured to execute an application program associated with the biomedia network;

the executed application program generates a user interface for presentation by the communications device; and the one or more computers further perform the operations of:
receiving a request to track identified default emotions shared within the biomedia network by one or more additional members of the biomedia network;
in response to the received request, generating data indicative of the identified default emotions shared by the one or more additional members; and
transmitting the generated data to the communications device to present a representation of the corresponding ones of the default emotions through the user interface.

12. The system of claim 11, wherein:
the request comprises (i) temporal data identifying one or more tracking intervals and (ii) user data identifying at least one of an identifier or a characteristic of the one or more additional members; and
based on the temporal and user data, the one or more computers further perform the operations of identifying the identified default emotions shared by the one or more additional members during the one or more tracking intervals.

13. The system of claim 12, wherein the one or more computers further perform the operations of:
based on the temporal and user data, identifying elements of electronics content shared by the one or more additional members within the biomedia network during the one or more tracking intervals;
generating additional data indicative of the shared elements of electronic content; and
transmitting the generated additional data to the communications device to present a representation of the corresponding ones of the default emotions and the shared elements of electronic content.

14. The system of claim 1, wherein the one or more computers further perform the operations of:
receiving a request for the data indicative of the particular default emotion, the request being received through a programmatic interface; and
in response to the request, transmitting at least a portion of the requested data through the programmatic interface.

15. The system of claim 1, wherein the first data identifies first contact positions, first contact pressures, and the first contact times associated with each of the first contacts during the collection period.

16. The system of claim 1, wherein determining the first values includes calibrating and normalizing the first data.

17. The system of claim 1, wherein determining the first values comprises extracting the first values from the first data.

18. The system of claim 1, wherein the first data comprises at least one of contact positions with respect to the touchscreen display unit during the first time-evolving movement, contact forces during the first time-evolving movement, contact pressures during the first time-evolving movement, muscle tensions during the first time-evolving movement, areas of contact between the portion of the body and the surface of the touchscreen display during the first time-evolving movement, and contact durations during the first time-evolving movement.

19. The system of claim 1, wherein:
the X coordinate of the portion of the body is an X coordinate of the portion of the body with respect to the touchscreen display unit;
the Y coordinate of the portion of the body is an Y coordinate of the portion of the body with respect to the touchscreen display unit;
the area of contact of the portion of the body is an area of contact between the portion of the body and the touchscreen display unit; and
the contact force of the portion of the body is a force applied by the portion of the body to the touchscreen display unit.

20. The system of claim 1, wherein:
the features further comprise a Z coordinate of the portion of the body in a space;
the X coordinate of the portion of the body is an X coordinate of the portion of the body in the space;
the Y coordinate of the portion of the body is an Y coordinate of the portion of the body in the space;
the area of contact of the portion of the body is an area of contact between the portion of the body and a surface; and
the contact force of the portion of the body is a force applied on the portion of the body by the surface.

21. The system of claim 1, wherein the features further comprise one or more of a speed of movement of the portion of the body, an acceleration of the portion of the body, a contact duration of the portion of the body, a change in contact pressure, a two-dimensional direction of movement of the portion of the body within a plane that is substantially parallel to the surface of the touchscreen display unit, a three-dimensional direction of movement of the portion of the body in a space, a size of the portion of the body, an applied maximum contact pressure of the portion of the body, a direction of the body with respect to the touchscreen display unit, a two-dimensional shape of movement of the portion of the body in a plane that is substantially parallel to the surface of the touchscreen display unit, or a three-dimensional shape of movement of the portion of the body in a space.

22. A computer-implemented method, comprising:
at a first time, presenting, on a touchscreen display unit of a communications device and using at least one processor, a user interface of a plurality of predictive models configured to determine emotions that are experienced by users, the user interface including representations of a plurality of default emotions;
receiving, through the user interface and using the at least one processor, (i) one or more first contacts on the touchscreen display unit, and (ii) data correlating the one or more first contacts with the plurality of default emotions;
training, using the at least one processor, the plurality of predictive models using the one or more first contacts and the data, to identify one or more default emotions of the plurality of default emotions upon being provided with data corresponding to contacts made with the touchscreen display unit;
at a second time, receiving, using the at least one processor, first data indicative of a first time-evolving movement of a portion of a body of the user of the communications device during a collection period, wherein the first time-evolving movement comprises a plurality of contacts established sequentially between the portion of the body of the user and a surface of the touchscreen display unit at corresponding first contact times during the collection period;

determining, using the first data and the at least one processor, first values of features that characterize the contacts during the collection period, wherein the features comprise an X coordinate of the portion of the body, a Y coordinate of the portion of the body, an area of contact of the portion of the body, a contact force of the portion of the body, and a time of movement of the portion of the body;

accessing second data about the plurality of predictive models that have been trained at the first time, wherein one or more of the plurality of predictive models correlates ranges of second values of one or more of the features obtained during prior collection periods to default emotions of the plurality of default emotions;

comparing, using the at least one processor and using at least one of a pattern recognition algorithm or a machine learning algorithm, the first values of the features determined using the first data to the second data;

in response to the comparing, determining, using the at least one processor, that one or more first values are within ranges of second values of one or more features that correlate with a particular default emotion of the plurality of default emotions;

in response to the determination, associating, using the at least one processor, the one or more first values with a predictive model that corresponds to the particular default emotion;

based on the associating, determining, using the at least one processor, that the first time-evolving movement of the portion of the body of the user during the collection period indicates that the particular default emotion is experienced by the user during the collection period; and transmitting, using the at least one processor, data indicative of the particular default emotion to the communications device to present a representation of the corresponding one of the default emotion.

23. A device, comprising:

a storage device;

a touchscreen display unit;

and one or more sensor devices; and at least one processor coupled to the storage device, the storage device storing software instructions for controlling the at least one processor when executed by the at least one processor, the at least one processor being operative with the software instructions and being configured to perform the operations of:

at a first time, presenting, on the touchscreen display unit of a communications device, a user interface of a plurality of predictive models configured to determine emotions that are experienced by users, the user interface including representations of a plurality of default emotions;

receiving, through the user interface, (i) one or more first contacts on the touchscreen display unit, and (ii) data correlating the one or more first contacts with the plurality of default emotions;

training the plurality of predictive models using the one or more first contacts and the data, to identify one or more default emotions of the plurality of default emotions upon being provided with data corresponding to contacts made with the touchscreen display unit;

at a second time, detecting, a first time-evolving movement of a portion of a body of the user of the communications device during a collection period, wherein the first time-evolving movement comprises a plurality of contacts established sequentially between the portion of the body of the user and a surface of the touchscreen display unit at corresponding first contact times during the collection period;

determining, using data indicative of the detected first time-evolving movement, first values of features that characterize the contacts during the collection period, wherein the features comprise an X coordinate of the portion of the body, a Y coordinate of the portion of the body, an area of contact of the portion of the body, a contact force of the portion of the body, and a time of movement of the portion of the body;

accessing second data about the plurality of predictive models that have been trained at the first time, wherein one or more of the plurality of predictive models correlates ranges of second values of one or more of the features obtained during prior collection periods to default emotions of the plurality of default emotions;

comparing, using at least one of a pattern recognition algorithm or a machine learning algorithm, the first values of the features determined using the data indicative of the detected first time-evolving movement to the second data;

in response to the comparing, determining that one or more first values are within ranges of second values of one or more features that correlate with a particular default emotion of the plurality of default emotions;

in response to the determination, associating the one or more first values with a predictive model that corresponds to the particular default emotion;

based on the associating, determining that the first time-evolving movement of the portion of the body of the user during the collection period indicates that the particular default emotion is experienced by the user during the collection period; and presenting a representation of the particular default emotion.

* * * * *